United States Patent
Wu et al.

(10) Patent No.: US 8,112,440 B2
(45) Date of Patent: Feb. 7, 2012

(54) RELATIONAL PATTERN DISCOVERY ACROSS MULTIPLE DATABASES

(75) Inventors: Xindong Wu, Essex Junction, VT (US); Xingquan Zhu, Boca Raton, FL (US)

(73) Assignee: The University of Vermont and State Agricultural College, Burlington, VT (US)

( * ) Notice: Subject to any disclaimer, the term of this patent is extended or adjusted under 35 U.S.C. 154(b) by 159 days.

(21) Appl. No.: 12/593,974

(22) PCT Filed: Apr. 14, 2008

(86) PCT No.: PCT/US2008/060228
§ 371 (c)(1),
(2), (4) Date: Mar. 5, 2010

(87) PCT Pub. No.: WO2008/128177
PCT Pub. Date: Oct. 23, 2008

(65) Prior Publication Data
US 2010/0179955 A1    Jul. 15, 2010

Related U.S. Application Data

(60) Provisional application No. 60/911,621, filed on Apr. 13, 2007.

(51) Int. Cl.
*G06F 17/30* (2006.01)

(52) U.S. Cl. ........ 707/776; 707/748; 707/797; 707/956; 707/E17.012

(58) Field of Classification Search ........... 707/E17.002, 707/999.107, 999.006, 797, 748, 776, 956
See application file for complete search history.

(56) References Cited

U.S. PATENT DOCUMENTS

| | | | |
|---|---|---|---|
| 5,692,174 A | 11/1997 | Bireley et al. | |
| 6,003,025 A | 12/1999 | Prager | |
| 6,415,286 B1 * | 7/2002 | Passera et al. | 1/1 |
| 6,618,725 B1 * | 9/2003 | Fukuda et al. | 1/1 |
| 6,665,669 B2 * | 12/2003 | Han et al. | 1/1 |
| 6,708,163 B1 | 3/2004 | Kargupta et al. | |
| 6,721,726 B1 | 4/2004 | Swaminathan et al. | |
| 7,243,100 B2 * | 7/2007 | Ma et al. | 1/1 |

(Continued)

FOREIGN PATENT DOCUMENTS

KR    1020050002630    1/2005

(Continued)

OTHER PUBLICATIONS

Moonesinghe et al., "Fast Parallel Mining of Frequent Itemsets", pp. 1-14, 2004.*

(Continued)

*Primary Examiner* — Leslie Wong
(74) *Attorney, Agent, or Firm* — Downs Rachlin Martin PLLC

(57) ABSTRACT

A system and method of identifying relational patterns across a plurality of databases using a data structure and the data structure itself. The data structure including one or more data node branches, each of the one or more data node branches including one or more data nodes, each of the one or more data nodes representing a data item of interest and corresponding data item support values for the data item across the plurality of databases in relation to other data items represented in the data node branch. The data structure can be used to mine one or more relational patterns considering pattern support data across the plurality of databases at the same time.

18 Claims, 17 Drawing Sheets

U.S. PATENT DOCUMENTS

| | | | |
|---|---|---|---|
| 7,509,677 B2 * | 3/2009 | Saurabh et al. | 726/23 |
| 7,933,915 B2 * | 4/2011 | Singh et al. | 707/760 |
| 7,958,096 B2 * | 6/2011 | Perrizo | 707/693 |
| 7,984,502 B2 * | 7/2011 | Saurabh et al. | 726/23 |
| 2003/0028531 A1 | 2/2003 | Han et al. | |
| 2004/0167897 A1 | 8/2004 | Kuhlmann et al. | |
| 2005/0027710 A1 | 2/2005 | Ma et al. | |
| 2006/0265362 A1 | 11/2006 | Bradford | |
| 2007/0005598 A1 | 1/2007 | Okamoto et al. | |

FOREIGN PATENT DOCUMENTS

| | | |
|---|---|---|
| WO | 2008128177 | 10/2008 |

OTHER PUBLICATIONS

Bailey et al., "Fast Algorithms for Mining Emerging Patterns", pp. 39-50, 2002.*

Qiao et al., "A tree Structure Frequent Pattern Mining Algorithm Based on Hybrid Search Strategy and Bitmap", pp. 452-456, 2009.*

Shang et al., "Efficient Frequent Pattern Mining in Relational Databases", pp. 1-8, 2004.*

International Search Report and Written Opinion dated Sep. 29, 2008 in connection with related International Application No. PCT/US2008/060228, filed Apr. 14, 2008, Inventors Xindong Wu and Xingquan Zhu.

Chengqi Zhang and Scichao Zhang. Database Clustering for Mining Multi-Databases. Proceedings of the 2002 IEEE International Conference on Fuzzy Systems. Aug. 2002, vol. 2, pp. 974-979, Digital Object Identifier 10.1109/FUZZ.2002.1006636. See pp. 974-977.

Scichao Zhang, Xindong Wu and Chengqi Zhang. Multi-Database Mining. IEEE Computational Intelligence Bulletin. Jun. 2003, vol. 2, No. 1, pp. 5-13, ISSN 1727-5997. See the Abstract and pp. 5-12.

Termier et al. Dyrade: A New Approach for Discovering Closed Frequeent Trees in Heterogeneous Tree Databases. Proceedings of the 4th IEEE International Conference on Data Mining—2004.

Han et al. Mining Frequent Patterns Without Candidate Generation. ACM2000, pp. 2-5.

Liu et al. On Computing, Storing and Querying Frequent Pattens. ACM 2003, pp. 607-608.

Ma et al. Mining Frequent Patterns Based on IS+-Tree. IEEE 2004, pp. 1208-1209.

Chi et al. HybridTreeMiner: An Efficient Algorithm for Mining Frequent Rooted Trees and Free Trees Using Canonical Forms. IEEE 2004.

Zhu et al. Mining Frequent Patterns with Incremental Updating Frequent Pattern Tree. IEEE Jun. 2006, pp. 5923-5924.

Zou et al. Mining Frequent Induced Subtree Patterns with Subtree-Constraint. IEEE 2006.

* cited by examiner

RELATIONAL PATTERN DISCOVERY ACROSS MULTIPLE DATABASES

RELATED APPLICATION DATA

This application claims the benefit of priority of U.S. Provisional Patent Application Ser. No. 60/911,621, filed Apr. 13, 2007, and titled "Relational Pattern Discovery Across Multiple Database," which is incorporated by reference herein in its entirety.

GOVERNMENT RIGHTS

The subject matter of this patent application was made with Government support under Grant No. NSF CCF-0514819 awarded by the National Science Foundation. The Government may have certain rights in the invention.

FIELD OF THE INVENTION

The present invention generally relates to the field of database pattern mining. In particular, the present invention is directed to a system and method for relational pattern discovery across multiple databases.

BACKGROUND

Many real-world applications involve the collection and management of data in multiple databases. Current methods for discovering patterns in multiple databases have difficulty in applying complex queries across databases. Several approaches exist that look to each database separately to discover patterns from each database that are then verified to determine if they meet a query. Sequential Pattern Verification (SPV) begins pattern mining from a seed database and then passes on the discovered patterns to a second database for verification. The sequential process repeats until patterns have been verified by all databases involved in a query. Parallel Pattern Mining (PPM) looks to each database individually to determine patterns. The discovered patterns are forwarded to a central location for verification against a query. SPV and PPM rely on pattern discovery individually from each database, where the mining process at each single database does not consider the existence of other databases (unless the patterns are then forwarded to another database for verification). Collaborative Pattern mining (CPM) generates length-l candidates from each database individually. All candidates from all databases are forwarded to a central location for candidate justification, such that only candidates satisfying certain conditions are redispatched to each database for the next round of pattern growing (length-l+1). This process repeats until no more candidates can be further generated. In another example, frequent pattern trees have been utilized to mine frequent patterns from single databases. Each of these three methods are Apriori-based techniques focused on single database mining. Many techniques for looking at data in multiple databases can only answer simple queries where each element of the query must explicitly specify one single database and a corresponding threshold value.

SUMMARY OF THE DISCLOSURE

In one embodiment, a computerized method of identifying relational patterns that exist across a plurality of databases, each of the plurality of databases including one or more records having one or more data items of interest, is provided. The method includes generating a hybrid frequent pattern tree from one or more records from each of the plurality of databases, the hybrid frequent pattern tree including one or more data node branches having one or more data nodes, each of the one or more data nodes representing one of the one or more data items of interest, the one or more data nodes of each of the one or more data node branches representing data items that are related to each other in records of the plurality of databases, each of the one or more data nodes having the following form: $\{x|y_1: \ldots :y_M\}$, where M is the number of the plurality of databases, x is a data item indicator for the one of the one or more data items of interest that is represented by the data node, $y_1, \ldots, y_M$ are data item support counters indicating the number of times that data item x appears in databases $D_1, \ldots, D_M$, respectively, in relation to other data items represented in the data branch having the data node; and mining the hybrid frequent pattern tree to identify one or more relational patterns that exists across the plurality of databases by considering pattern support data across the plurality of databases at the same time, the pattern support data based on the data item support data for the plurality of databases in the data item support counters of the hybrid frequent pattern tree.

In another embodiment, a system for identifying relational patterns that exist across a plurality of databases, each of the plurality of databases including one or more records having one or more data items of interest, is provided. The system includes a plurality of databases; means for generating a hybrid frequent pattern tree from the one or more records of the plurality of databases, the hybrid frequent pattern tree including one or more data node branches, each of the one or more data node branches including one or more data nodes, each of the one or more data nodes representing a data item of interest and corresponding data item support values for the data item across the plurality of databases in relation to other data items represented in the data node branch, the means for generating a hybrid frequent pattern tree operatively connected to the plurality of databases; means for mining the hybrid frequent pattern tree to identify one or more relational patterns that exists across the plurality of databases by considering the data item support values across the plurality of databases at the same time and determining pattern support values for the one or more relational patterns across the plurality of databases; and means for outputting the one or more relational patterns.

In yet another embodiment, data structure for identifying relational patterns that exist across a plurality of databases, each of the plurality of databases including one or more records having one or more data items of interest, the data structure residing in a machine readable medium, is provided. The data structure includes a root node; a plurality of data nodes linked to the root node in a downwardly expanding tree structure having a plurality of data node branches; wherein each of the plurality of data nodes has a form $\{x|y_1: \ldots :y_M\}$, where M is the number of the plurality of databases, x is a data item indicator for the one of the one or more data items of interest that is represented by the data node, $y_1, \ldots, y_M$ are data item support counters indicating the number of times that data item x appears in databases $D_1, \ldots, D_M$, respectively, in relation to other data items represented in the data branch having the data node.

In still another embodiment, machine readable medium comprising machine executable instructions for identifying relational patterns that exist across a plurality of databases, each of the plurality of databases including one or more records having one or more data items of interest, is provided. The instructions include a set of instructions for generating a hybrid frequent pattern tree from the one or more records of the plurality of databases, the hybrid frequent pattern tree including one or more data node branches having one or more data nodes, each of the one or more data nodes representing one of the one or more data items of interest, the one or more data nodes of each of the one or more data node branches representing data items that are related to each other in records of the plurality of databases, each of the one or more data nodes having the following form: $\{x|y_1:\ldots:y_M\}$, where M is the number of the plurality of databases, x is a data item indicator for the one of the one or more data items of interest that is represented by the data node, $y_1, \ldots, y_M$ are data item support counters indicating the number of times that data item x appears in databases $D_1, \ldots, D_M$, respectively, in relation to other data items represented in the data branch having the data node; and a set of instructions for mining the hybrid frequent pattern tree to identify one or more relational patterns that exists across the plurality of databases by considering pattern support data across the plurality of databases at the same time, the pattern support data based on the data item support data for the plurality of databases in the data item support counters of the hybrid frequent pattern tree.

In still yet another embodiment, a computer data signal embodied in a data carrier for causing a computer to execute instructions for identifying relational patterns that exist across a plurality of databases, each of the plurality of databases including one or more records having one or more data items of interest, is provided. The data signal causes the computer to perform the steps of generating a hybrid frequent pattern tree from the one or more records of the plurality of databases, the hybrid frequent pattern tree including one or more data node branches having one or more data nodes, each of the one or more data nodes representing one of the one or more data items of interest, the one or more data nodes of each of the one or more data node branches representing data items that are related to each other in records of the plurality of databases, each of the one or more data nodes having the following form: $\{x|y_1:\ldots:y_M\}$, where M is the number of the plurality of databases, x is a data item indicator for the one of the one or more data items of interest that is represented by the data node, $y_1, \ldots, y_M$ are data item support counters indicating the number of times that data item x appears in databases $D_1, \ldots, D_M$, respectively, in relation to other data items represented in the data branch having the data node; and mining the hybrid frequent pattern tree to identify one or more relational patterns that exists across the plurality of databases by considering pattern support data across the plurality of databases at the same time, the pattern support data based on the data item support data for the plurality of databases in the data item support counters of the hybrid frequent pattern tree.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
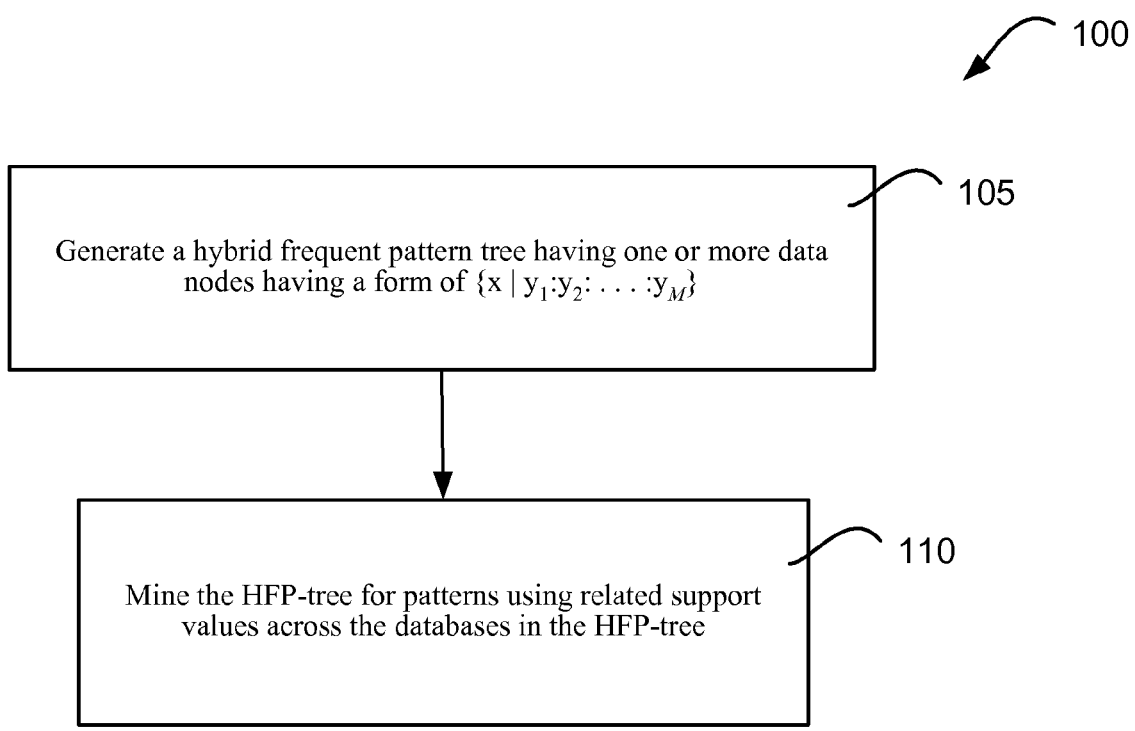
FIG. 1 illustrates one exemplary implementation of a method for discovering one or more relational patterns from across multiple databases using an HFP-tree.

FIG. 1 illustrates one exemplary implementation of a method 100 of identifying relational patterns that exist across databases. In one exemplary aspect, method 100 can discover relational patterns and their relationships as they exist across the multiple databases utilizing a single data structure view of the support for the patterns. This exemplary aspect is an advantage over the discovery of relational patterns as they exist in a single database, which can ignore the relationships amongst the patterns in the different databases. At step 105, method 100 includes generation of a hybrid frequent pattern tree from data records of multiple databases. As is discussed further below, a data record may include any number of data items. A hybrid frequent pattern tree (HFP-tree) includes one or more data branches, each having one or more data nodes having a form of $\{x|y_1:y_2:\ldots:y_M\}$ where M is the number of the databases; x is an indicator of one of the one or more data items of interest that is represented by the data node; $y_1, y_2, \ldots, y_M$ are the number of times that data item x appears in relation to other data items represented in the data branch in databases $D_1, D_2, \ldots, D_M$, respectively, that contains the particular data node. The form of $\{x|y_1:y_2:\ldots:y_M\}$ may include the information therein in any graphical or non-graphical representation in information and/or instructions that may be implemented by a machine. M can be any number of two or more databases addressed by a particular query and $y_1:y_2:\ldots:y_M$ represents the support of a data item in relation to other data items in each of the two or more databases, respectively. For example, where M=2, a data node of the general form $\{x|y_1:y_2:\ldots:y_M\}$ may take the form of $\{x|y_1:y_2\}$. As used herein, the terminology of $y_1:y_2:\ldots:y_M$ is intended to encompass implementations having 2 databases where $y_1:y_2: \ldots :y_M$ equals $y_1:y_2$ and the terminology $D_1, D_2, \ldots, D_M$ encompasses $D_1, D_2$. Additional aspects of exemplary HFP-trees and methods for constructing an HFP-tree are discussed further below.

At step 110, method 100 includes mining the HFP-tree to discover one or more relational patterns that exists across the databases by considering support data residing in the data branches of the HFP-tree (e.g., in the support values of $y_1: y_2: \ldots :y_M$ of related data nodes in a data branch of the HFP-tree) for each of the one or more relational patterns across each of the databases at the same time. The HFP-tree includes the support values for data items (as they relate to other data items in records) in all of the databases in a single data construct. In one example, mining a single branch of an HFP-tree can, in one traversal, indicate support for a relationship of a relational pattern across all of the databases. Exemplary processes for mining an HFP-tree are discussed further below.

Figure 2:
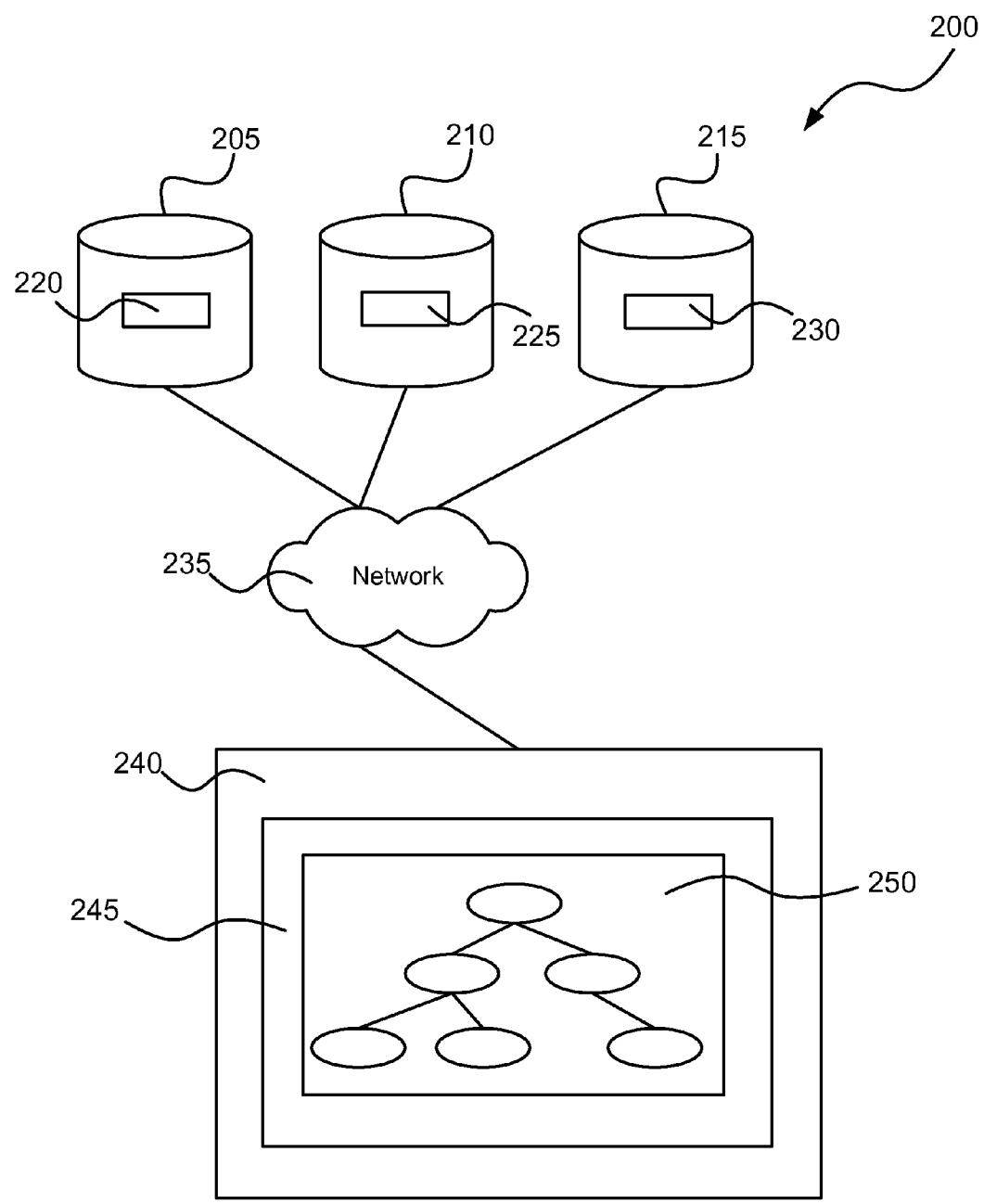
FIG. 2 illustrates one exemplary implementation of a system for discovering one or more relational patterns from across multiple databases.

FIG. 2 illustrates an exemplary environment 200 for a system and method of identifying relational patterns that exist across databases, such as method 100 of FIG. 1. FIG. 2 illustrates databases 205, 210, 215, each having one or more data records 220, 225, 230, respectively, and being connected to a network 235. FIG. 2 illustrates three databases connected to network 235. It is contemplated that a system and/or method as disclosed herein may be utilized to discover one or more relational patterns across any number of two or more databases, which may be connected to a network, such as network 235. FIG. 2 illustrates a machine 240 including a machine readable medium 245 having a system 250 for identifying relational patterns and their relationships that exist across databases 205, 210, 215. System 250 may also include machine executable instructions for discovering relational patterns and their relationships across databases 205, 210, 215.

A database (e.g., databases 205, 210, 215) may be any datastore and/or data collection having one or more data records. Examples of a database include, but are not limited to, a transaction database (e.g., a retail transaction database), a national census database (e.g., data of different states in a particular year, data of a certain state in different years), a network log database, market basket transaction data from different branches of a wholesale store, data collections from different time periods, and any combinations thereof. In one example, a database may be stored in a physical data system, device, or any combination thereof. A physical data system may include software and/or hardware for storing data information. Examples of software physical data systems include, but are not limited to, an Oracle database, a Microsoft Access database, a SQL database, SYBASE, and any combinations thereof. Examples of hardware physical data systems include, but are not limited to, a hard drive, other machine readable medium, and any combinations thereof. Examples of a machine readable medium are set forth below with respect to FIG. 8. In one example, a single physical data structure may include one or more databases. In another example, multiple databases may be dispersed on one or more physical data structures. In yet another example, multiple databases may reside in a single data table (e.g., with records belonging to each database having an indicator, such as a field value, that associates each record with one of the multiple databases). In still another example, multiple databases may reside in a single set of relational tables.

A data record (e.g., data records 220, 225, 230) may include any number of data items. Examples of data items include, but are not limited to, a demographic data, a retail data (e.g., a product purchased at a retail outlet), scientific data, and any combinations thereof.

Network 235 may be any combination of one or more mechanisms for communicatively interconnecting databases 205, 210, 215 with system 250. Examples of a network and related aspects are discussed further below with respect to FIG. 10. It is contemplated that any of databases 205, 210, 215 may be connected using the same or different network types. In one example, network 235 includes a distributed network, such as the Internet. In another example, network 235 includes a local network, such as a local area network. In yet another example, network 235 includes a direct (e.g., wired and/or wireless) connection between any two or more of databases 205, 210, 215 and system 250. It is also contemplated that one or more of databases 205, 210, 215 and system 250 may reside on, and/or be associated with, the same machine (e.g., machine 240). In such an example, network 235 may include internal wiring, circuitry, or other mechanism for communicatively connecting the components associated with a machine. One or more of databases 205, 210, 215 and system 250 may also be distributed over multiple machines.

In one implementation, a pattern, P, that exists across multiple databases may take the form of an itemset (e.g., a set of data items that satisfies one or more constraints). In one example, the support of a pattern, P, in a database, D, may be designated as $\text{Sup}_D^P$, which represents the ratio between the number of appearances of P in D and the total transaction number in D. The term support as used herein describes in certain situations the frequency of data items appearing in one or multiple databases (e.g., within one or more records) and in other situations is used to describe the ratio of frequency and the number of records in the database. These can be used interchangeably.

One or more constraints may specify the patterns for discovery from a set of databases. A constraint may include one or more relationship factors and/or one or more operators. Example relationship factors include, but are not limited to, $X \geq \alpha$, indicating that a support of a pattern of a database X is no less than a threshold, $\alpha$, $X > \alpha$, indicating that a support of a pattern of a database X is larger than a threshold, $\alpha$, $X \leq \alpha$, indicating that a support of a pattern of a database X is no larger than a threshold, $\alpha$ $X < \alpha$, indicating that a support of a pattern of a database X is less than a threshold, $\alpha$. Example operators include, but are not limited to, X+Y, indicating the operation of summing up the support values of a pattern in both database X and database Y; X−Y, indicating the operation of subtracting the support in Y from the support in X; X & Y indicates the operation of X and Y; X|Y indicating the operation of X or Y; |X| indicating the absolute support value in X. It is noted that "+" directly sums up support values from participant databases. The results from this operator do not reveal patterns' support values from the union of the participant databases. This operator may be helpful when a data manager intends to find the average support of patterns across multiple databases.

A query includes the one or more constraints taking the form of a combination of relationship factors and/or operators. In one exemplary aspect, a query includes a database and a relationship factor. In another example, a query may include one or more relationship factors and one or more operators. A pattern that satisfies a query may be designated a relational pattern. Examples of relational patterns include, but are not limited to, frequent patterns, constrained frequent patterns, closed frequent patterns, sequential patterns, and any combinations thereof.

In one example, a valid query for determining a relational pattern includes at least one relationship factor that has a numerical threshold value following immediately thereafter (e.g., the query $\{A \geq B \geq C \geq \alpha\}$ includes pattern support in databases A, B, and C related by relationship factor "$\geq$" and an additional relationship factor "$\geq$" immediately followed by a threshold, $\alpha$. For example, one or more constraints may include $\{A \geq B \geq \alpha\}$, which indicates a pattern with its support values in database A and database B both larger than a threshold, $\alpha$, and in addition, a pattern's support in A should be larger than its support in B.

Pattern and relationship discovery across multiple databases may be useful in a variety of situations. Example situations include, but are not limited to, national census data analysis, network intrusion detection, molecular genetic data analysis (e.g., discovery of patterns of diseases along an evolving order), product sales analysis, discovery of gradually increasing shopping patterns of customers in a certain period of time, comparative analysis of biologic data, and any combinations thereof.

In one example, residents of north eastern states of America (i.e., the so called "New England" area including the states of Connecticut (CT), Maine (ME), Massachusetts (MA), New Hampshire (NH), Rhode Island (RI), and Vermont (VT)) may be studied. Similarity/differences between residents in this area and the residents on the West Coast, say California (CA) may also be studied. Data records having data items about residents in these states may be included in databases CT, ME, MA, NH, RI, VT, and CA, respectively. Exemplary queries involving discovery of patterns across these databases include: finding patterns that are frequent with a support level of a in all of the New England states, but significantly infrequent with support level of $\beta$ in California, i.e., $\{(CT \geq \alpha) \& (ME \geq \alpha) \& (MA \geq \alpha) \& (NH \geq \alpha) \& (RI \geq \alpha) \& (VT \geq \alpha)\} \& \{CA < \beta\}$; finding patterns that are frequent with a support level of $\alpha$ in the New England area, with respect to all states, i.e., $\{(CT+ME+MA+NH+RI+VT) \geq \alpha\}$; finding patterns that are frequent with a support level of $\alpha$ in all New England States, but with their supports declining from northern to southern states, i.e., $\{ME>(NH|VT)>MA>(CT|RI) \geq \alpha\}$; and any combinations thereof.

In another example, gene expression data may be studied for genetic disease profiling (e.g., for molecular cancer classification). In one such example, in order to detect signature patterns for Leukemia, (e.g., Acute Myeloid Leukemia (AML) and Acute Lymphoblastic Leukemia (ALL)), a microbiologist may split the underling data into four datasets, with $D_1$ containing gene expression data of normal tissues, $D_2$ containing data of AML tissues, $D_3$ containing data of ALL tissues, and $D_4$ containing data for all other cancer tissues. Exemplary queries involving discovery of patterns across these databases include: finding the patterns that are frequent with a support level of a in either of the cancer datasets: $D_2$, $D_3$, or $D_4$, but are significantly infrequent in $D_1$. i.e., $\{(D_2|D_3|D_4) \geq \alpha\} \& \{(D_1 < \beta)\}$; finding the patterns that are frequent with a support level of $\alpha$ in all cancer datasets, but with support in Leukemia tissues higher than other cancers tissues. i.e., $\{(D_2|D_3) \geq D_4 \geq \alpha\}$;

A user of databases such as these databases may know some basic features of these data collections, such as the date and time each database was collected, or the region or entity each database may represent. Systems and method of the present disclosure may be utilized to discover the relationship of the patterns hidden across multiple data collections.

Figure 3:
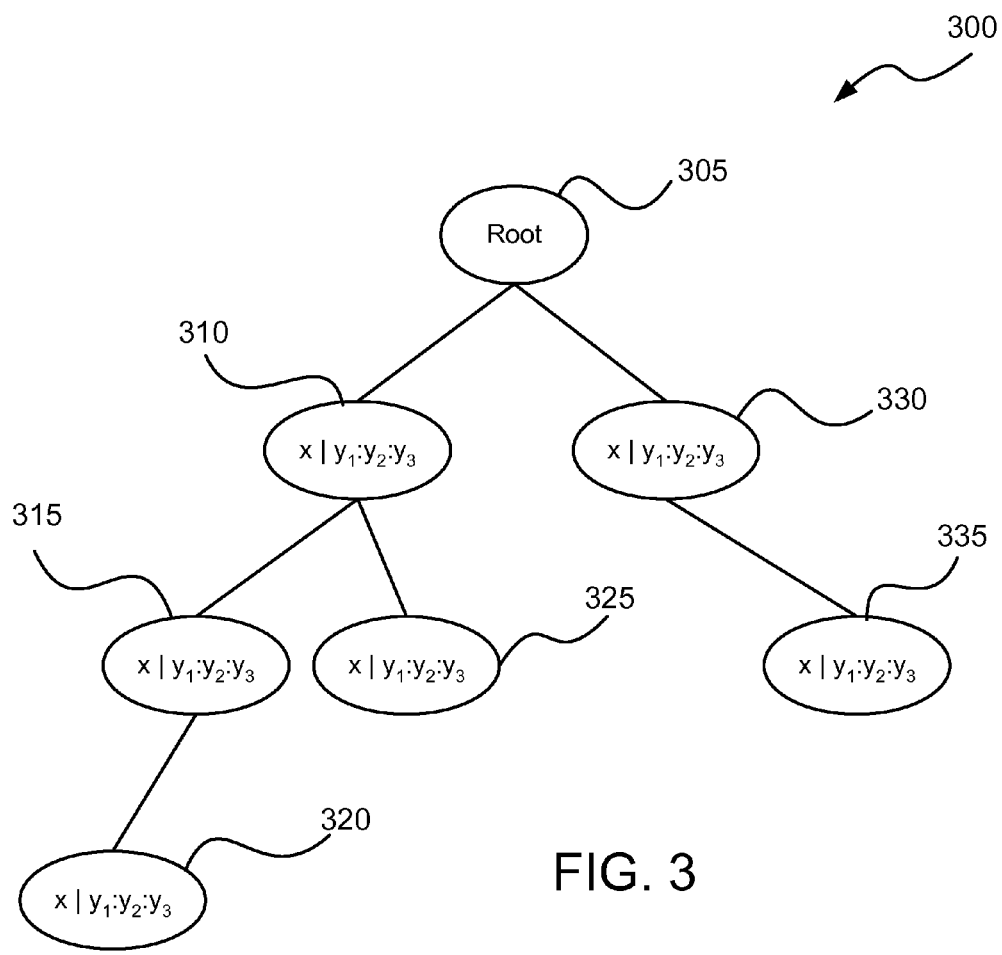
FIG. 3 illustrates one exemplary implementation of a data structure for identifying one or more relational patterns from across multiple databases.

FIG. 3 illustrates one exemplary implementation of an HFP-tree data structure 300 for determining relational patterns across multiple databases. Data structure 300 is shown as a graphical representation. Those of ordinary skill in the art will recognize a variety of ways to implement data structure 300 (e.g., as information associated with machine executable instructions) other than in a graphical representation. For example, data structure 300 may be implemented as text-based software coding. Data structure 300 represents data from three databases (e.g., $D_1$, $D_2$, $D_3$). It is noted that any number of two or more databases may be represented by an HFP-tree. Data structure 300 includes a root node 305 and data nodes 310, 315, 320, 325, 330, 335. Each data node 310, 315, 320, 325, 330, 335 has a form of $\{x|y_1:y_2:y_3\}$ where x is a data item indicator for representing a data item corresponding to the particular node. The data item support counters, $y_1:y_2:y_3$, of each data node are for indicating the support for data item x in relation to data items represented by data nodes linked to the given data node. Data nodes 310, 315, 320 are linked together in a data branch that extends from root node 305 to data node 320. Data nodes 310, 325 are linked together in a data branch that extends from root node 305 to data node 325. Data nodes 330, 335 are linked together in a data branch that extends from root node 305 to data node 335. Data items represented by data nodes of a data branch are related to each other, and the support data for their relationships to each other in all three databases are indicated by the corresponding data item support counters, $y_1:y_2:y_3$. In one exemplary aspect, a data branch of HFP-tree 300 may be traversed from one data node upward toward root node 305 to consider support across $D_1$, $D_2$, $D_3$ for a pattern including data items represented by the data nodes traversed.

Figure 4:
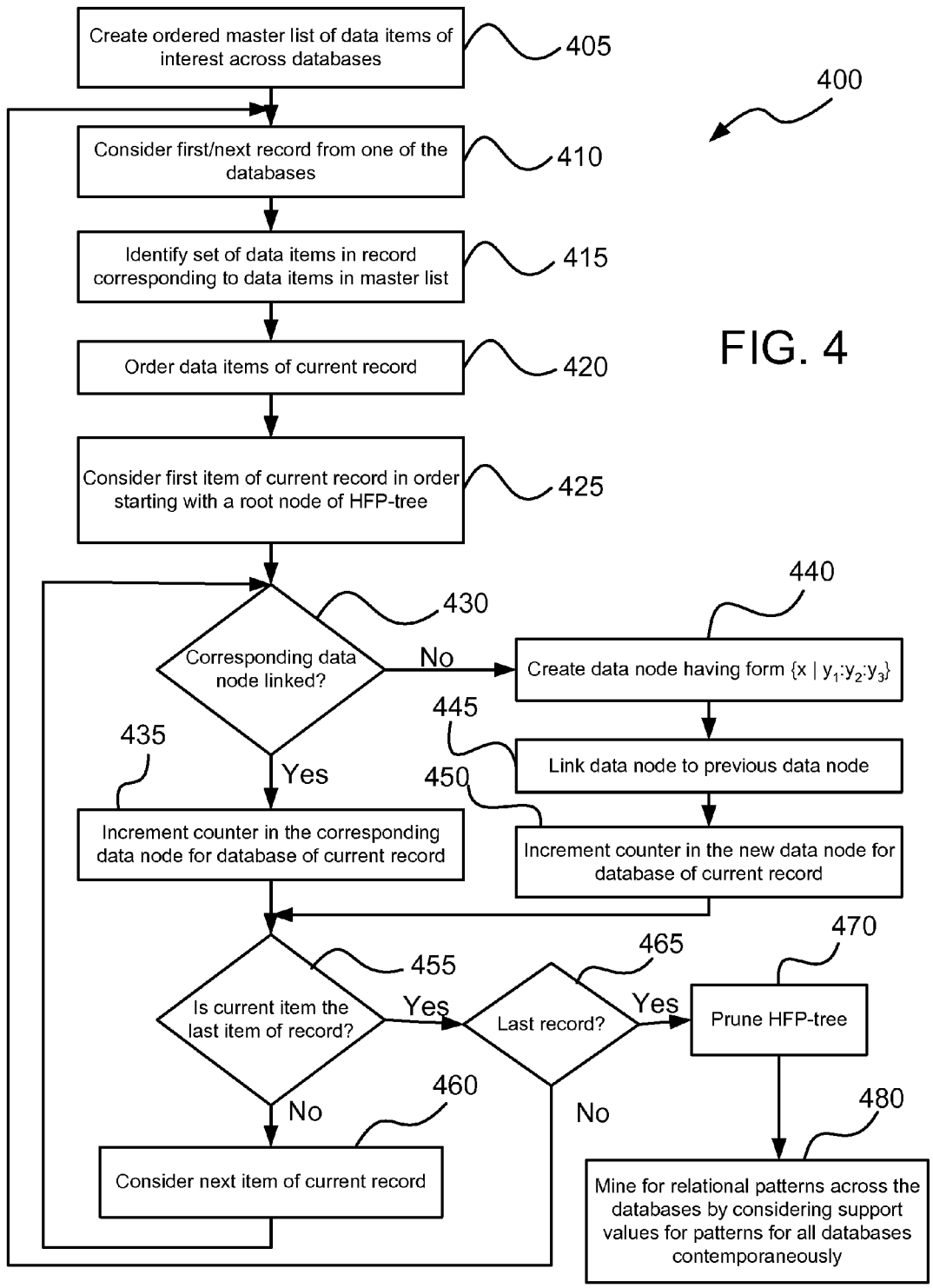
FIG. 4 illustrates another exemplary implementation of a method for discovering one or more relational patterns from across multiple.

FIG. 4 illustrates another implementation of a method 400 of identifying relational patterns that exist across multiple databases. Method 400 may be utilized with two or more databases each including one or more data records, which each have one or more data items. At step 405, data items of interest are identified across all of the databases implicated in a query and are organized into a uniform ranking order. The ranking order may be maintained in a variety of ways. In one example, the ranking order may be maintained in a data file. In another example, the ranking order may be maintained in a computer memory. In yet another example, the ranking order may be maintained in a header table (e.g., a header table similar to those of a traditional single database frequent pattern tree). Header tables are discussed further below.

Data records of two or more databases may include more data items than are of interest to a particular inquiry. In one such example, the data items of interest may include a subset of all of the data items across the multiple databases. For example, if three databases ($D_1$, $D_2$, $D_3$) include data items $\{a, b, c, d, e, f, g\}$ and a particular inquiry is interested in discovering patterns involving only data items $\{a, c, e, g\}$, the ranking order and the HFP-tree generated may include only data items $\{a, c, e, g\}$. In another example, data items of interest may include all of the data items across multiple databases (e.g., data items $\{a, b, c, d, e, f, g\}$). Determination of which data items are of interest may occur in a variety of ways. Example ways of determining data items of interest include, but are not limited to, comparing the total occurrences of a data item across the databases (regardless of relation to other data items) to a threshold value and eliminating those that do not meet the threshold; eliminating data items that are not of interest to a particular query; and any combinations thereof.

Organizing data items of interest into a uniform order across the databases prior to construction of an HFP-tree can significantly minimize the size of the resultant tree. This may also potentially lessen the time and resources required for mining relational patterns from the HFP-tree. Step 400 is not a mandatory step in method 400 and it is contemplated that in some situations step 405 may be optional. The inclusion of an ordering step may be influenced by the size of the databases, the number of data items of interest, time issues associated with an inquiry, computing resources available for mining patterns from an HFP-tree, other considerations, and any combinations thereof.

Data items of interest may be ordered in a variety of ways. In one example, data items of interest may be ordered in alphabetical order. In another example, data items of interest may be ordered in a frequency of occurrence basis (e.g., with respect to an individual database, with respect to all databases). Ordering may be done in a decreasing manner. Ordering may also be done in an increasing manner.

In yet another example, given M databases $D_1, D_2, \ldots, D_M$ for HFP-tree construction, assume $I_1, I_2, \ldots,$ and $I_N$ are the union of the data items in each of the databases, respectively. Each database, $D_i$, is scanned and the data items in $D_i$ are ranked in a descending order of their frequency. Equation (1) below can be used to determine a master data item order across the M databases.

$$\overline{R}^j = \frac{1}{M} \sum_{i=1}^{M} R_i^j \qquad (1)$$

where $R_i^j$ is the average ranking order of item $I_j$ in database $D_i$ (with the first item in the list denoted by a value of 1), and the master data item ranking list for all items is constructed by ranking $\overline{R}^j, j=1, 2, \ldots N$, in an ascending order, where items with the least average ranking are listed at the top.

In still another example, the weight of occurrence of an item in a database may also be considered in development of a master ordering of data items across multiple databases prior to generation of an HFP-tree. In such an example, a size (number of transactions) of the databases involved in the query may vary significantly from one to the other, where a database containing more transactions will carry more weight in deciding the final ranking of a particular item. In one such example, the ranking of a master ordering of data items across databases may be determined according to Equation (2) may be modified to take the size of each database into consideration. Assume $S_i$ is the number of transactions in $D_i$, then $S=S_1+S_2+\ldots+S_M$ denotes the total number of transactions. The weighted average ranking order is then represented in Eq. (2).

$$\overline{R}^j = \frac{1}{M} \sum_{i=1}^{M} \frac{S-S_i}{S} R_i^j \qquad (2)$$

where M represents the number of the databases, $D_i$ represents each of the databases where $i=1, 2, \ldots M$, N represents the number of data items of interest ($I_j$, where $j=1, 2, \ldots N$) in the plurality of databases, $R_i^j$ represents the ranking order of data item $I_j$ in database $D_i$ (with the first item in the ranking having a ranking order denoted by 1), $S_i$ is the number of records in $D_i$, $S=S_1+S_2+\ldots+S_M$ represents the total number of transactions, and the final ranking order of the ordered master listing is constructed by ranking $\overline{R}^j, j=1, 2, \ldots N$, in an ascending order.

At step 410 of FIG. 4, generation of an HFP-tree begins with the consideration of a first record from one of the multiple databases being considered in the inquiry. The records of the multiple databases may be considered in any order from any of the databases during the generation of the HFP-tree.

At step 415, a set of data items in the current record is identified that corresponds to the data items of interest (e.g., the data items in an ordered master list). For example, if the data items of interest are {a, c, e, g}, the corresponding data items of a record are identified. A data record may include additional data items that do not correspond to the data items of interest. In one example, these additional data items will not be used in the generation of an HFP-tree in exemplary method 400. In another example, these additional data items may be used. In such a case, the resultant HFP-tree may be larger than necessary to determine patterns of interest.

At step 420, the set of data items in the current record are ordered in the same order as the ordered master list.

At step 425, the first data item of the current record in the order is considered for generation of an HFP-tree. The process of generating data nodes for one or more data items of a record begins at a root node of the HFP-tree. Method 400 proceeds to step 450.

At step 430, it is determined if the previous data node considered has a data node corresponding to the data item currently being considered directly linked to the previous data node. In one example, where the first data item of a set for a current record is under consideration, it is determined if there is a data node that corresponds to the first data item (i.e., has a data item indicator corresponding to the data item being considered) directly linked to the root node (i.e., as a child node to the root node). In another example, where a subsequent data item of a set for a current record is under consideration, it is determined if there is a data node that corresponds to the subsequent data item directly linked to the previously considered data node.

If there is a corresponding data node directly linked, method 400 proceeds to step 435. At step 435, the data item support counter for the database of the current record for the linked data node (the one corresponding to the data item under consideration) is incremented by a value of "1." For example, for a data item "a" of a record from a database $D_3$ (where there are three databases, $D_1, D_2, D_3$) and an existing data node having the form {a|0:0:1} prior to incrementing at step 435, the counter ($y_3$) corresponding to $D_3$ is incremented from a support value of "1" to a support value of "2."

If, at step 430, it is determined that there is not a corresponding data node directly linked, method 400 proceeds to step 440. At step 440, a data node having the form {x|$y_1$:$y_2$:$y_3$} is generated for the data item, x. In one example, the support values for each of $y_1$:$y_2$:$y_3$ may be set to a value of zero upon generation of the new data node. In another example, the default support values for each of $y_1$:$y_2$:$y_3$ may be set to a value other than zero, that value indicative of a null value, upon generation of the new data node. In one example, during generation of a new data node, the data item indicator is also set to represent the corresponding data item being considered.

At step 445, the new data node is linked dependently from the last considered data node in the branch (e.g., if the first data item of a record is being considered, the direct link is from the root node). At step 450, the data item support counter that corresponds to the database of the current record is incremented to a value of "1." In another example, the corresponding data item support counter may be set to a value of "1" as part of the generation of the counter (e.g., at the time of generating the data node at step 440.

Method 400 proceeds to step 455. At step 455, it is determined if the data item currently being considered (e.g., the data item for which a counter was incremented) is the last data item in the ordered set for the current record.

If the data item is not the last data item, method 400 proceeds to step 460. At step 460, the next data item in the ordered set for the current record is considered and method 400 proceeds to step 430. Steps 430 to 460 are repeated for the next data item considered at step 460.

If, at step 455, it is determined that the data considered at step 455 is the last data item of the current record, method 400 proceeds to step 465. At 465, it is determined if the current record is the last record for consideration across all of the databases in the inquiry.

If the current record is not the last record, method 400 proceeds to step 410. Steps 410 to 465 are repeated for the next record. As discussed above, the records in the databases may be taken up for consideration in any order. It is also contemplated that two or more records (and/or two or more data items of each record) may be taken up for consideration simultaneously during the HFP-tree generation. In one example, such a multithreaded generation may depend on computing processing capabilities.

If, at step 465, the current record is the last record, the construction of the HFP-tree is complete. In one example, an HFP-tree may be utilized to determine patterns across multiple databases for a single implementation of a single query. In another example, an HFP-tree may be utilized to determine patterns across multiple databases for multiple implementations of one or more queries.

The generated HFP-tree may be handled and/or stored in a variety of ways. Example ways for handling and/or storing a generated HFP-tree include, but are not limited to, storing the HFP-tree in a memory, outputting the HFP-tree, continuing processing the HFP-tree by mining patterns therefrom, and any combinations thereof. A variety of memory devices are discussed below with respect to FIG. 10. An HFP-tree may be output in a variety of ways. In one example, an HFP-tree may be output from one component of a system for discovering patterns across multiple databases (e.g., system 250 of FIG. 2) to another component of a system for discovering patterns across multiple databases (e.g., a component for mining patterns). In another example, an HFP-tree data structure may be output to a display device via a mechanism for generating a displayable image of the HFP-tree data structure (e.g., as a graphical representation, as a text-based representation). Example display devices and mechanisms for generating a displayable image are discussed below with respect to FIG. 10 and are known to those of ordinary skill.

Method 400 includes an optional step 470. At step 470, a generated HFP-tree is pruned to minimize its size prior to mining patterns from the HFP-tree. An HFP-tree may be pruned in a variety of ways. An example of a pruning process is discussed further below with respect to FIGS. 7 and 8.

After generation of an HFP-tree (and optionally after pruning), method 400 may proceed to step 480. At step 480, the HFP-tree is mined to discover relational patterns across the multiple databases by considering the support values of patterns across the multiple databases at the same time using the multiple database support data embedded in the data branches of the HFP-tree. An HFP-tree may be mined in a variety of ways. An example of a mining process is discussed further below with respect to FIGS. 7 and 8.

In another exemplary aspect of an HFP-tree (e.g., an HFP-tree generated according to method 400 of FIG. 4), a header table may be constructed to summarize the locations of data items appearing in an HFP-tree. Example header tables are discussed further below with respect to the exemplary implementations. A header table may list each of the locations where an item appears in an HFP-tree. In one exemplary aspect, access to item sets ending with the same item may be facilitated using the header table.

TABLE 1

Database Records for HFP-Tree 500 of FIGS. 5A to 5H

| Database 1 ($D_1$) | Database 2 ($D_2$) | Database 3 ($D_3$) |
|---|---|---|
| {a, c, f} | {a, c} | {c, f} |
| {a, f} | {c, f} | {c, g, h} |
| {c, g, h} | | {c, g, i} |

FIGS. 5A to 5H illustrate one implementation of a generation of an exemplary HFP-tree 500 for the example data in Table 1. Table 1 includes information for three databases: database 1 ($D_1$) with three records, database 2 ($D_2$) with two records, and database 3 ($D_3$) with three records. The data items across the databases include data items of interest a, c, f, g, h, and i. It is contemplated that each record may also include one or more other data items that may not be of interest (e.g., may not be frequent enough across the database for a particular inquiry). For purposes of discussion of this implementation, the data items of interest are ordered alphabetically (a, c, f, g, h, and i) and the data items of interest in each record will be considered in this order. Other ordering schemes are also contemplated for the generation of an HFP-tree, examples of which are discussed further herein.

Figure 5A:
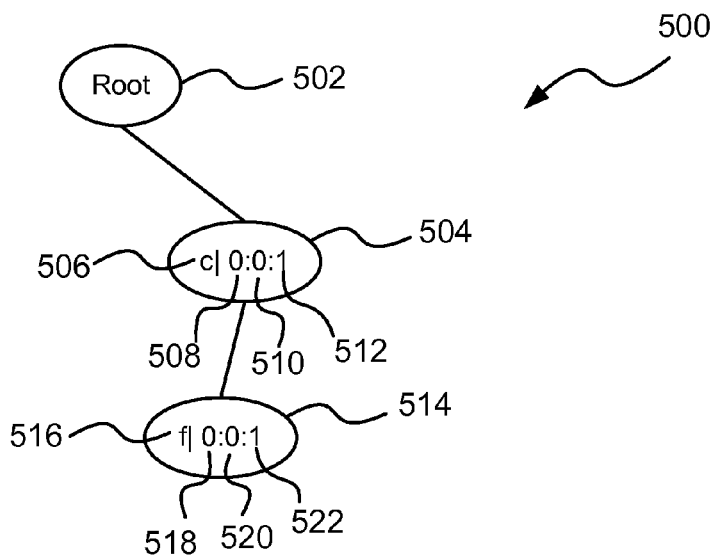
FIG. 5A to 5H illustrates one exemplary implementation of a method for generating an HFP-tree.

FIG. 5A illustrates a portion of HFP-tree 500 generated from the first record listed in Table 1 for $D_3$. The exemplary implementation of HFP-tree 500 is shown in FIGS. 5A to 5H as a stepwise process of looking to one record at a time from the databases. The order in which the records are considered is not necessarily important to the generation of the data structure. In one example, records may be considered in any order across the databases being considered. As illustrated in Table 1, the first record of $D_3$ includes data items {c, f}. Data nodes for this record can be populated in an HFP-tree starting at a root node 502. Data item "c" is considered first in the order established for considering data items across the multiple databases. Root node 502 initially has no data nodes directly dependent thereto (e.g., directly linked to root node 502). A data node 504 is created having a data item indicator 506 representing data item "c." The data node also includes three counters 508, 510, 512, each representing the number of occurrences of data item "c" in records in each of $D_1$, $D_2$, $D_3$, respectively, in relation to the data items represented by the other data nodes of the current data branch of HFP-tree 500. With respect to the first record of $D_3$, counter 512 is incremented to a value of "1." Counters 508 and 510 each have values of "0" representing that no records having a data item of "c" first in the order of data items of interest from either $D_1$ or $D_2$ have yet been considered in generation of HFP-tree 500.

Data item "f" of the first record of $D_3$ is now considered. Since no data node representing a data item "f" is directly linked to data node 504, a data node 514 is generated with a data item indicator 516 representing data item "f" and three counters 518, 520, 522 representing the number of occurrences of data item "f" in records in each of $D_1$, $D_2$, $D_3$, respectively, in relation to the data items represented by the other data nodes of the current data branch of HFP-tree 500. Counter 522 is incremented to a value of "1" for the current record.

Figure 5B:
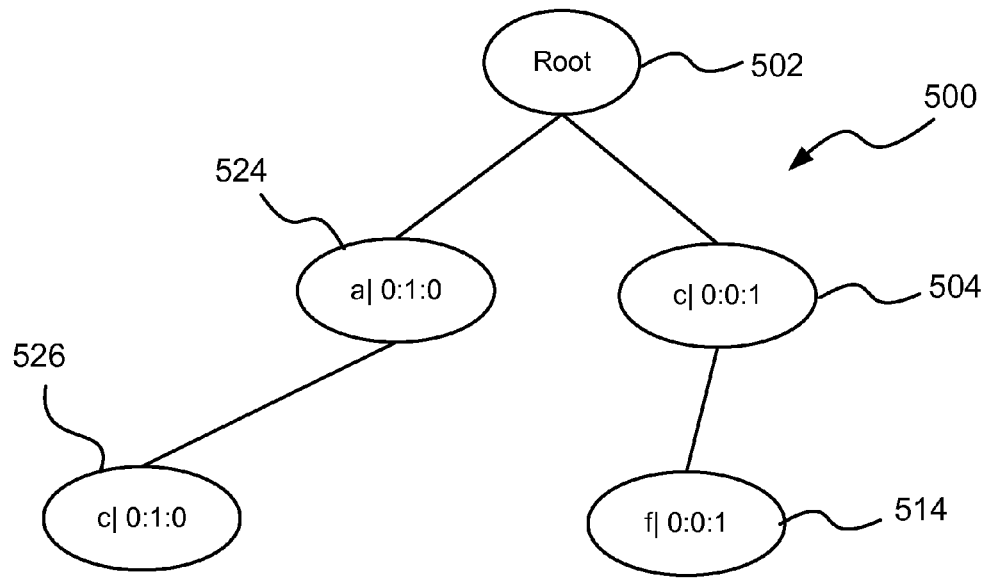

FIG. 5B illustrates further generation of HFP-tree 500 with respect to the first record of $D_2$, {a, c}, from Table 1. As illustrated by data nodes 504 and 514, each data node of HFP-tree 500 has a form of $(x|y_1, y_2, y_3)$ where x is a data item indicator representing the data item associated with the particular data node and $y_1$, $y_2$, $y_3$ representing the number of occurrences of data item x in records of $D_1$, $D_2$, $D_3$, respectively, in relation to the data items represented by the other data nodes of the same branch of HFP-tree 500. Considering data item "a" of the first record of $D_2$, HFP-tree 500 as illustrated in FIG. 5A does not include a data node directly linked to root node 502 that represents a data item "a." Referring again to FIG. 5B a data node 524 is generated with a data item indicator representing data item "a" and three counters, one each for $D_1$, $D_2$, $D_3$. As shown in FIG. 5B, the counter for $D_2$ in data node 524 is incremented to a value of "1" for the first record of $D_2$. The counters for $D_1$ and $D_3$ in data node 524 have values of "0." Considering the next and final data item of interest, "f," in the first record of $D_2$, it is determined that no data node representing data item "f" was directly linked dependent from data node 524. A data node 526 is generated with a data item indicator representing data item "f" and three counters, one for each database. The counters for $D_1$ and $D_3$ in data node 526 have values of "0", and the counter for $D_2$ is incremented to the value "1", since none of the records of $D_1$ or $D_3$ yet considered had a second data item "f" following a first data item "a", whereas the $D_2$ record just considered had this composition.

Figure 5C:
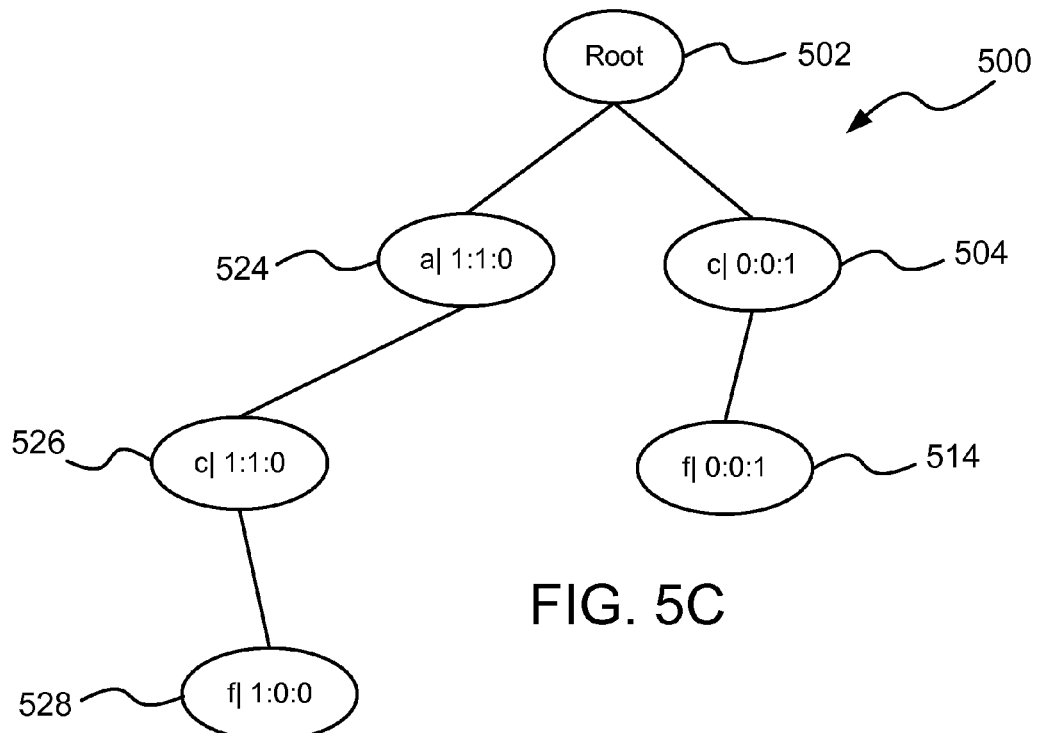

FIG. 5C illustrates yet further generation of HFP-tree 500. Considering the first data record of $D_1$, {a,c,f} from Table 1. Considering the first data item of this record, "a", the HFP-tree 500 as illustrated in FIG. 5B already includes data node 524 with data item indicator "a" directly linked to root node 502. Rather than create a new node, the data item support counter of node 524 for $D_1$ is incremented from "0" to "1". The counters for $D_2$ and $D_3$ remain at "1" and "0" respectively, resulting in data node 524 represented by {$x|y_1$:$y_2$:$y_3$}= (a|1:1:0). The next ordered data item of current $D_1$ data record, "c", is considered. It is determined that there data node 526 represents this data item and is linked directly from data node 524. The data item support counter for $D_1$ in data node 526 is incremented from a value of "0" to a value of "1."

The last data item of the first data record of the $D_1$ database, "f", is considered. It is determined that the prior data node considered, data node 526, does not have a data node linked directly as a child node that represents data item "f." A new data node 528 is created, also shown in FIG. 3C. Data node 528 includes a data item indicator representing data item "f". The three counters for this data node have values of "1, 0, 0" (with the data counter for $D_1$ incremented by a value of "1") and the node is represented by the form $(x|y_1, y_2, y_3)$=(f|1, 0, 0). The first ordered data records of each database, $D_1$, $D_2$, and $D_3$ create the HFP-tree shown in FIG. 3C.

Figure 5D:
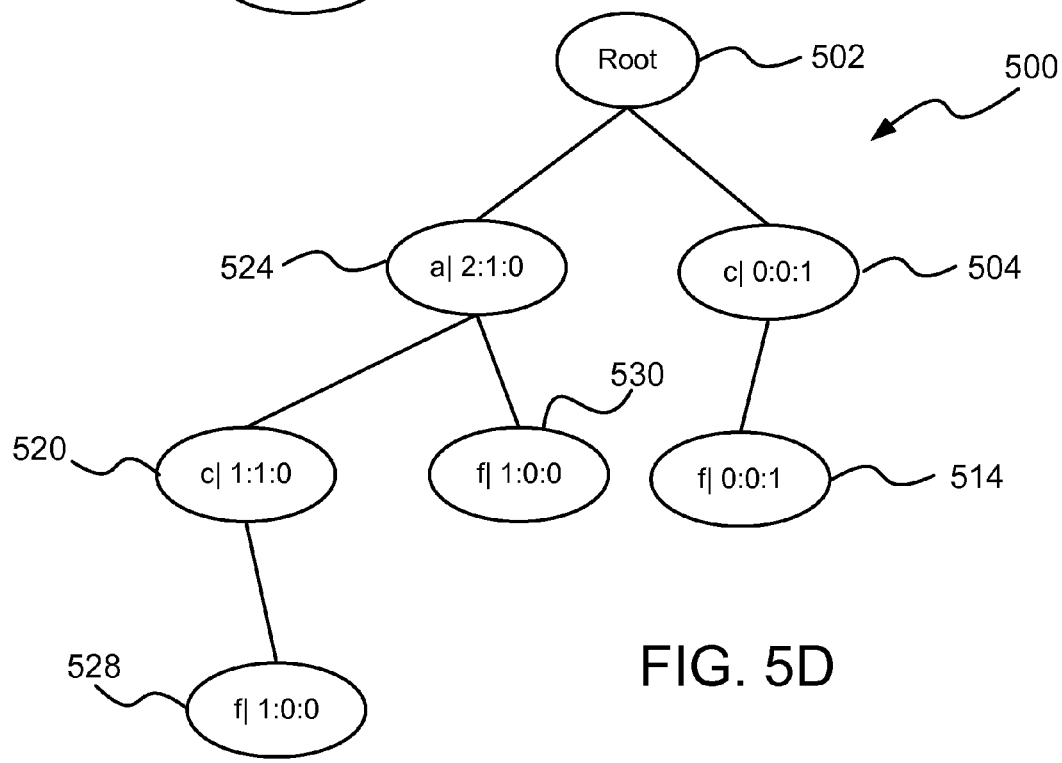

FIG. 5D illustrates the addition of the second data record of the $D_1$ database, {a,f}, to HFP-tree 500. Starting from root node 502, the first data item "a" in the current record is considered. It is determined that data node 524 represents data item "a" and is directly linked to root node 502, which as shown in FIG. 5C, had support values of "1:1:0" prior to adding the second data record of $D_1$. Since the current record is from $D_1$, the $D_1$ counter is incremented by 1, resulting in support values of "2:1:0". The next data item in the current data record is data item "f". It is determined that data node 524 does not have a data node linked directly to data node 524 that represents data item "f." A new data node 530 that represents data item "f" is created and linked from data node 524. Data node 530 has counters for each database. The support counter corresponding to $D_1$ for data node 530 is incremented to an initial value of "1." The other counters have an initial value of "0." This completes the tree with regard to the second data record of $D_1$.

Figure 5E:
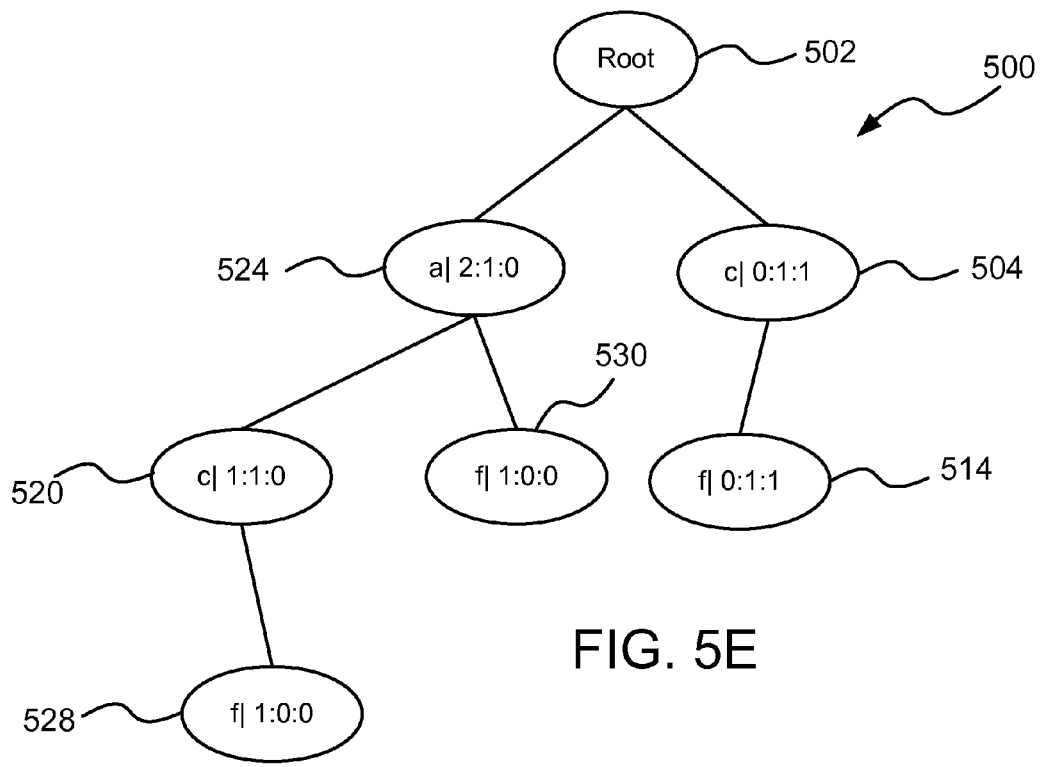

FIG. 5E illustrates the addition of the second data record of the second database D2, {c,f} to HFP-tree 500 from FIG. 5D. Starting from root node 502, the first data item "c" of the current record is considered. It is determined that data node 504 represents data item "c" and is directly linked to root node 502. The data item support counter for $D_2$ in data node 504 is incremented by a value of "1" from the previous value of "0." The second data item "f" of the current record is considered. It is determined that data node 514 represents data item "f" and is directly linked to data node 504. The data item support counter for $D_2$ in data node 504 is incremented by a value of "1" from the previous value of "0." This completes the addition of the second data record of $D_2$.

Figure 5F:
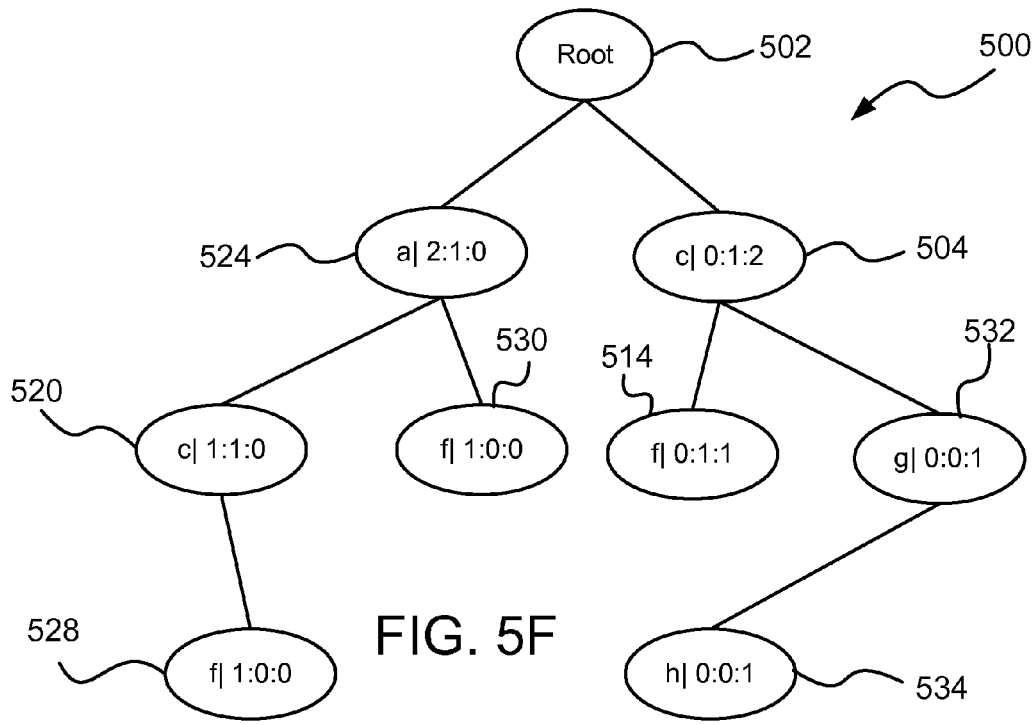

The second data record of database D3 is (c,g,h) is considered. FIG. 5F illustrates the extension of the HFP-tree to account for this data record. Data node 504 represents the data item "c" of the current record and is directly linked to root node 502. The $D_1$ counter 508 and $D_2$ 510 counter will remain the same, but because we are processing a $D_3$ data record, the $D_3$ counter 512 will be incremented from "1" to "2". The next data item in the data record is data item "g". It is determined that there is no data node in HFP-tree 500 as depicted in FIG. 5E that represents data item "g" and is directly linked dependently from data node 504. A new data node 532 is created and directly linked to data node 504. Data node 532 includes a data item indicator representing the data item "g" and three data item support counters, one each for each of $D_1$, $D_2$, $D_3$. Data node 532 takes the form of {g|0:0:1}, with the counter for $D_3$ having a value of "1." The third and final data item in the current data record is "h." It is determined that no data node depends directly from data node 532 and represents data item "h." A new data node 534 linked dependently from data node 532 is created with the form {h|0:0; 1}. This completes HFP-tree 500 with respect to the initial two data records from each of the three databases.

Figure 5G:
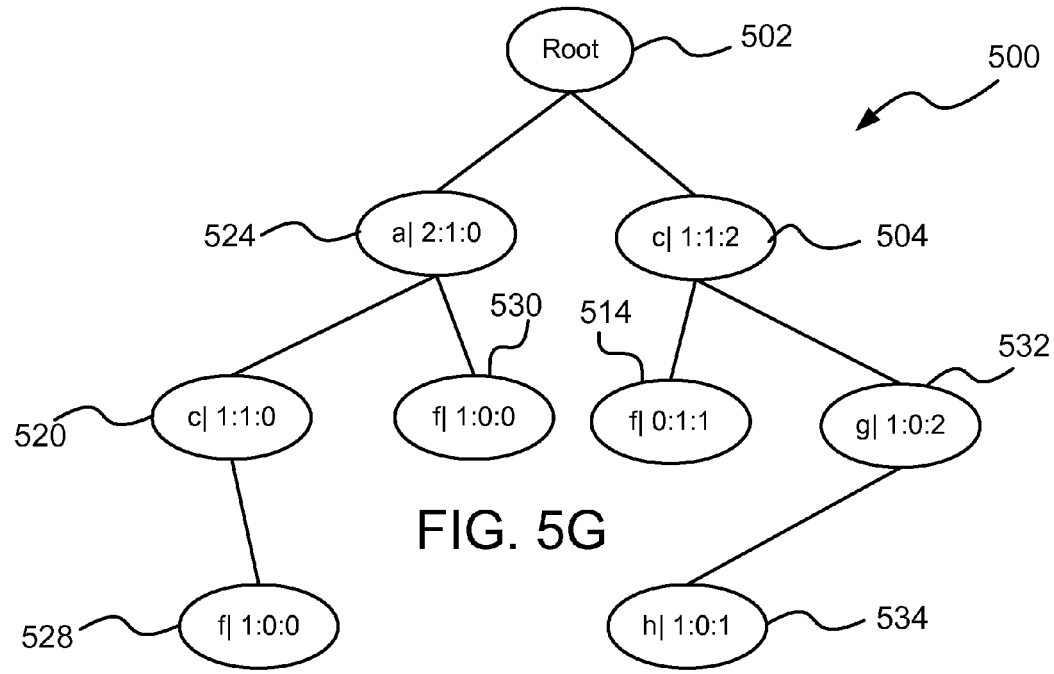

FIG. 5G illustrates the addition of the third data record of $D_1$ to HFP-tree 500 as depicted in FIG. 5F. Starting from root node 502, the first data item "c" of the current record is considered. It is determined that data node 504 represents data item "c" and is directly linked to root node 502. The data item support counter for $D_1$ in data node 504 is incremented by a value of "1" from the previous value of "0." The second data item "g" of the current record is considered. It is determined that data node 532 represents data item "g" and is directly linked to data node 504. The data item support counter for $D_1$ in data node 532 is incremented by a value of "1" from the previous value of "0." The third and final data item "h" of the current record is considered. It is determined that data node 534 represents data item "h" and is directly linked to data node 532. The data item support counter for $D_1$ in data node 534 is incremented by a value of "1" from the previous value of "0." This completes the addition of the third data record of $D_1$.

Figure 5H:
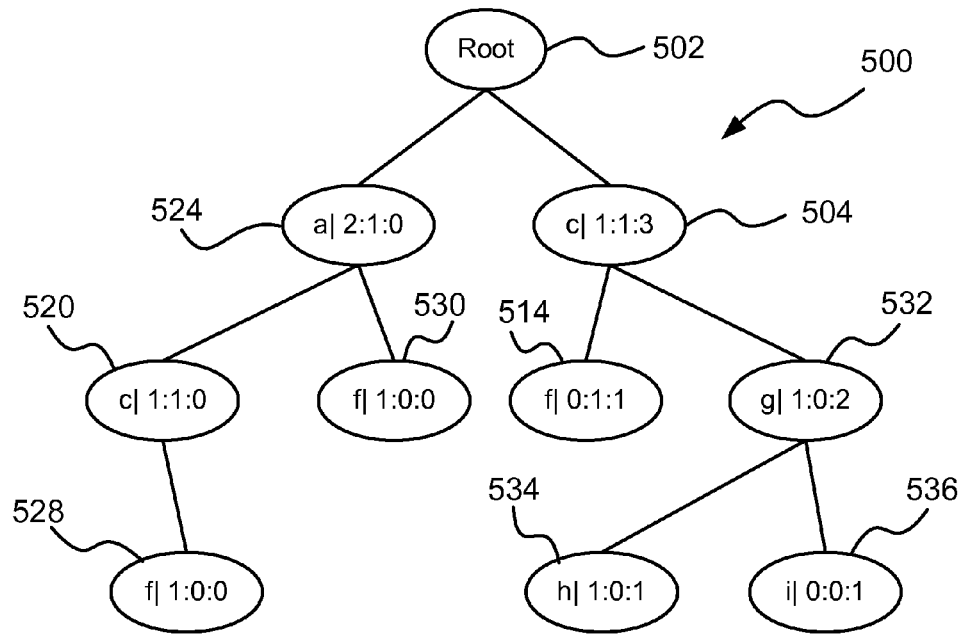

FIG. 5H shows the final result of processing every data record from each of the three databases in Table 1. The $D_3$ data record {c,g,i} is considered. It is determined that It is determined that data node 504 represents data item "c" and is directly linked to root node 502. The data item support counter for $D_3$ in data node 504 is incremented by a value of "1" from the previous value of "2" to a value of "3." The second data item "g" of the current record is considered. It is determined that data node 532 represents data item "g" and is directly linked to data node 504. The data item support counter for $D_3$ in data node 532 is incremented by a value of "1" from the previous value of "1" to a value of "2." The last data item "i" of the current record is considered. It is determined that data node 532 does not have a data node directly linked thereto that represents data item "i." A new data node 536 is created having a form {i|0:0:1} representing data item "i" with the support counter for $D_3$ at a value of "1." HFP-tree data structure 500 is complete with respect the data records listed in Table 1 for $D_1$, $D_2$, $D_3$ and includes support data for patterns across the three databases. It is noted that the order of consideration of data records does not impact the resultant HFP-tree 500.

TABLE 2

Figure 6:
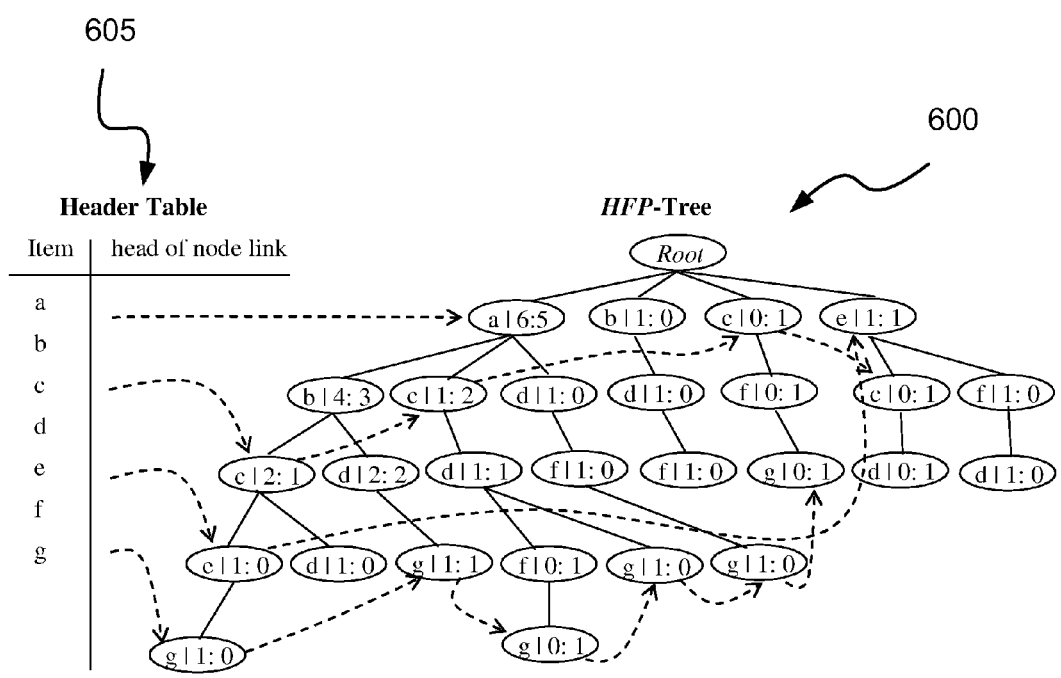
FIG. 6 illustrates another exemplary implementation of a data structure for identifying one or more relational patterns from across multiple databases.

Database Records for HFP-tree 600 of FIG. 6

| Database $D_1$ | | Database $D_2$ | |
| --- | --- | --- | --- |
| Trans ID | Items | Trans ID | Items |
| 1 | {a, b, d} | 1 | {c, f, g} |
| 2 | {a, d, f, g} | 2 | {a, b, d, g} |
| 3 | {a, b, c, d} | 3 | {a, b, c} |
| 4 | {a, c, d, g} | 4 | {a, b, d} |
| 5 | {b, d, f} | 5 | {a, c} |
| 6 | {a, b, d, g} | 6 | {e, c, d} |
| 7 | {e, f, d} | 7 | {a, c, d, f, g} |
| 8 | {a, b, c, e, g} | | |

FIG. 6 illustrates another exemplary embodiment of an HFP-tree data structure 600 generated from exemplary data from Table 2. The data records listed in Table 2 are for two databases, $D_1$ and $D_2$. Each of databases $D_1$ and $D_2$ include data records (i.e., transactions). Each transaction, T, includes a combination of data items represented by a master listing of {a, b, c, d, e, f, g}. A convenient way to order the master listing is alphabetically. The data items in each record of Table 2 are also shown ordered alphabetically.

Construction of HFP-tree 600 followed process similar to that of method 400 and that followed to generate data structure 500. Given a transaction in $D_1$, (e.g., Trans 1 $T_1^1$={a, b, d} the HFP-tree construction will starts from the first item, "a." A determination is made whether any child data node of the Root has the same item name. Since the HFP-tree is empty at this stage, "a" is not a child of Root. A new child node θ={a|1:0} is constructed for Root, which specifies that "a" is a child of Root with "a" appearing once in $D_1$ and zero time in $D_2$. Next, the second item "b" in $T_1^1$ is examined, determining whether "b" is a child of the recently built node θ={a|1:0}. θ currently has no child, so another node θ1={b|1:0} is built; this node is the child of θ. This means that itemset {ab} has appeared once in $D_1$ but 0 time in $D_2$. Next the process moves to the third item "d" in $T_1^1$. The data item "d" is not a child of the recently built node θ1, so another new node θ2={d|1:0} is constructed and set as the child of θ1. This means that itemset {abd} has appeared once in $D_1$ but still 0 time in $D_2$. For any other transactions in $D_1$ or $D_2$, the procedure is repeated.

Using the third transaction in $D_2$, $T_3^2$={a, b, c}, as an example, first check whether Root has any child node named "a". Such a node was previously constructed. This node is denoted by x, and x's frequency count is increased for database $D_2$ by 1. This node is checked for any child node named b, i.e., the second item of $T_3^2$. The count is increased for $D_2$ by 1, if such a node indeed exists; otherwise, a new member {b|0:1} is simply added as the child node of x. We recursively repeat the above procedure until we finish the last item in $T_3^2$. The process is repeated for all records in Table 2 to generate HFP-tree 600.

FIG. 6 also illustrates an exemplary representation of a portion of a header table 605 for HFP-tree 600. Header table 605 may be created at any time. In one example, header table 605 is generated as each data node of HFP-tree 600 is created.

A header table, such as header table 605, may assist in pruning and/or mining patterns from an HFP-tree. In one example, header table 605 includes information about the location of each data node for a given data item in HFP-tree 600. As shown in FIG. 6 for data items {a, c, e, g} with arrows from each data item in header table 605, header table 605 includes information pointing to the location of data nodes for data items a, c, e, and g. Header table 605 is discussed further below with respect to examples of mining patterns from HFP-tree 600.

Table 3 illustrates yet another exemplary implementation of a method for generating an HFP-tree for mining relational patterns that exist across multiple databases. The method of Table 3 has inputs of databases $D_1, \ldots, D_M$ and corresponding minimal support thresholds $\alpha_1, \ldots, \alpha_M$ used to determine data items in the databases for inclusion in the ordered master data item list (e.g., a "joint ranking list) and HFP-tree minimal support thresholds (indicated in Table 3 as $\alpha_1, \ldots, \alpha_M$).

TABLE 3

Exemplary Implementation of Method for Generating an HFP-tree

Figure 7:
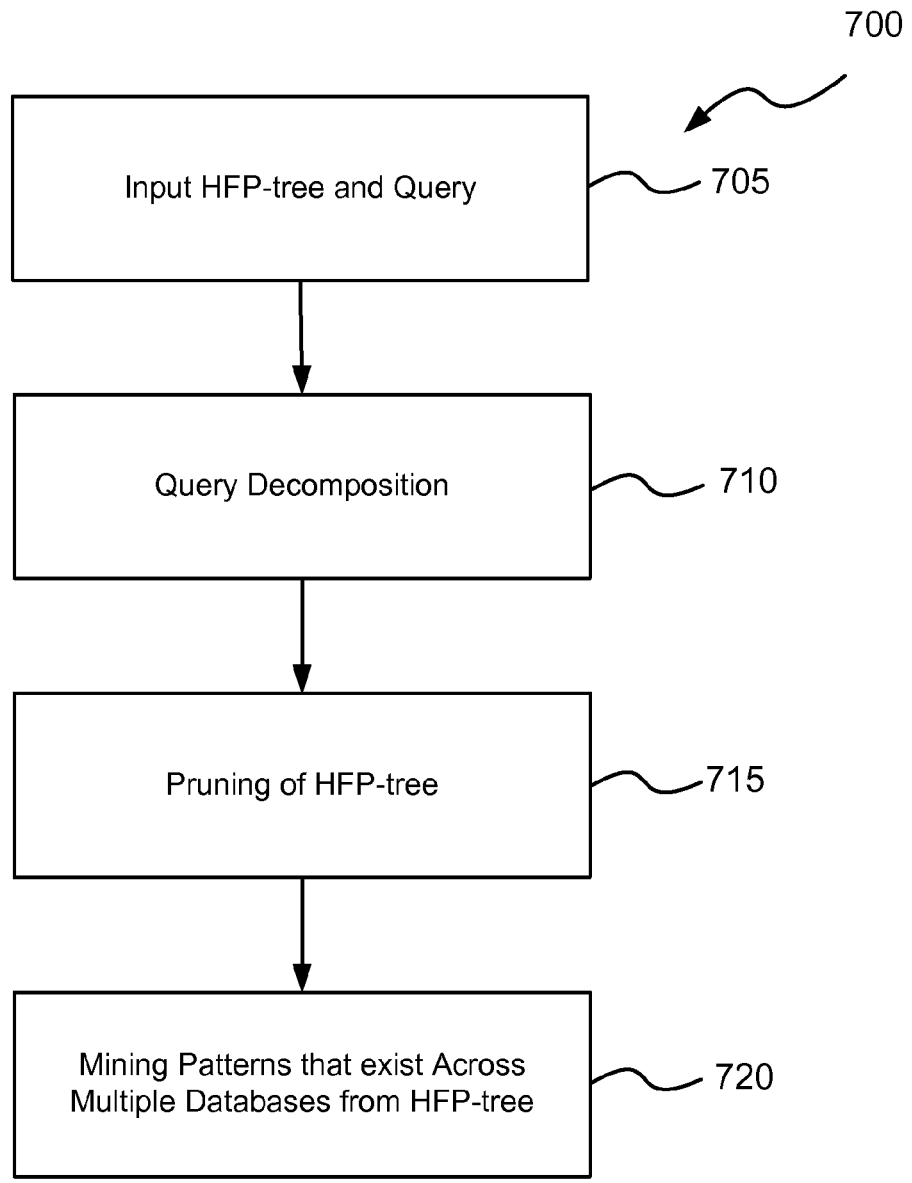
FIG. 7 illustrates one exemplary implementation of a method for determining one or more patterns from an HFP-tree.

Input: Databases $D_1, \ldots, D_M$, and their minimal support thresholds $\alpha_1, \ldots, \alpha_M$.
Output: Hybrid Frequent Pattern tree, HFP-tree
1. Initialize an empty HFP-tree with node Root only
2. Scan each database $D_1, \ldots, D_M$ once, and calculate the ranking order of each item $I_1, \ldots, I_N$ in each single database (items with their support less than the corresponding threshold $\alpha_i$ are eliminated).
3. Use Eq. (2) to produce a joint ranking list L
4. For each transaction $T_k^i$ in $D_i$, sort items in $T_k^i$ according to the list L. Denote sorted $T_k^i$ by $\vec{T}_k^i$ with items in $\vec{T}_k^i$ denoted by $I_1^i, \ldots, I_K^i$
5. θ ← Root; κ ← 1
6. For all children x of v
  a. If x.item_name = $I_κ^i$.item_name, increase the corresponding frequency count by step 1 (the one corresponding to $D_i$)
    i. θ ← x, κ ← κ+1. Repeat step 5 until κ=K.
  b. If no child of v has item_name $I_κ^i$.item_name, create a new node y with y.item_name = $I_κ^i$.item_name. Initialize y's frequency to zero except for $D_i$, which is set to 1.
    i. Insert y as v's child
    ii. θ ← y, κ ← κ+1. Repeat step 5 until κ=K.
7. Repeat step 4 for all databases $D_1, \ldots, D_M$, then return the constructed HFP-tree FIG. 7 illustrates one exemplary implementation of a method 700 for mining relational patterns across two or more databases from an HFP-tree generated for the databases (e.g., generated via method 400). At step 705 an HFP-tree and a query are provided (e.g., input from a process for generating the HFP-tree and a user input, respectively). At optional step 710, the query may be decomposed into one or more subqueries that comply with the down closure property. In one aspect a query or subquery that complies with the down closure property will have a subset of a frequent itemset also be frequent. In one example, a query having both the "≦" and "<" relationship factors may not comply with the down closure property. If a query or subquery does not comply with the down closure property the query or query cannot be used to prune the HFP-tree. In one exemplary aspect, decomposed subqueries may be added to a "Down Closure" (DC) subset for use in the pruning step 715 and the original query maintained for use in verifying one or more patterns mined from the HFP-tree (e.g., at step 720). At optional step 715, the HFP-tree is pruned. At step 720, one or more patterns that exist across the databases are mined from the HFP-tree using the support data of all databases embedded in the data structure of the HFP-tree at the same time. An exemplary pruning process and an exemplary mining process are discussed further below with respect to FIG. 8.

In decomposing a query, one or more decomposition properties may be utilized. One example of a decomposition property sets forth that if a subquery has a single database and a threshold value α listed on the left and right side of the relationship factor "≧" or ">" respectively, then this subquery complies with the down closure property. This property is based directly on the Apriori rule in frequent itemset mining. If a pattern P's support in a database is less than a given threshold α, then any supersets of P (the patterns growing from P) will also have their support less than α. If a query involves multiple databases, factors "≧" or ">", and a single threshold value α, we may decompose this query into a set of subqueries with each single database and the threshold value α listed on the left and right sides of the factor. For example, the query {A≧B≧C≧α} can be decomposed into three subqueries (A≧α), (B≧α), and (C≧α), and placed into a DC set. It is obvious that if a pattern P violates any one of these three subqueries, there is no way for P, as well as P's any supersets, to be a qualified pattern for the original query. It is worth noting that subqueries in the DC set are merely for pattern pruning purposes, and are not used herein to replace the original query for final pattern verification of those patterns that survive a pruning process.

In another example of a decomposition property, if a subquery has the sum ("+") of multiple databases and a threshold value α listed on the left and right side of factor "≧" or ">" respectively, then this subquery complies with the down closure property. For example, a subquery like {(A+B+C)≧α} complies with the down closure property, and can be directly put into a DC set. Given a pattern P and any of its subpatterns Q, assuming P's and Q's supports in A, B and C are $P_1$, $P_2$, $P_3$ and $Q_1$, $Q_2$, $Q_3$ respectively, $Q_1 \geq P_1$, $Q_2 \geq P_2$, $Q_3 \geq P_3$. If $(P_1 + P_2 + P_3) \geq \alpha$, $(Q_1 + Q_2 + Q_3) \geq (P_1 + P_2 + P_3) \geq \alpha$. This property states that if a subquery sums up multiple databases and is followed by factors "≧" or ">" and a threshold value α, then it can be placed into a DC set for pattern pruning.

In yet another example of a decomposition property, if a subquery has the support difference of two databases, say (A−B), and a threshold value a listed on the left and right side of factors "≧" or ">" respectively, then this subquery can be further transformed into a subquery like A≧α, which still complies with the down closure property.

In still another example of a decomposition property, if a subquery has the absolute support difference of two databases, say |A−B|, and a threshold value α listed on the left and the right side of factors "≧" or ">" respectively, then this query can be transformed into a subquery like {(A≧α)|(β≧α)}, which still complies with the down closure property. If |A−B|≧α, then (A−B)≧α or (A−B)≦−α, which leads to the inequations A≧(B+α) or B≧(A+α), i.e. {(A≧α)|(β≧α)}. For any pattern P, if its supports in A and B are both less than α, there is no way for P's superset to have a higher support than α. It will still comply with the down closure property.

In still yet another example of a decomposition property, a subquery involving relationship factors "≦" or "<" will not comply with the down closure property, and should not be placed into the DC set.

Figure 8:
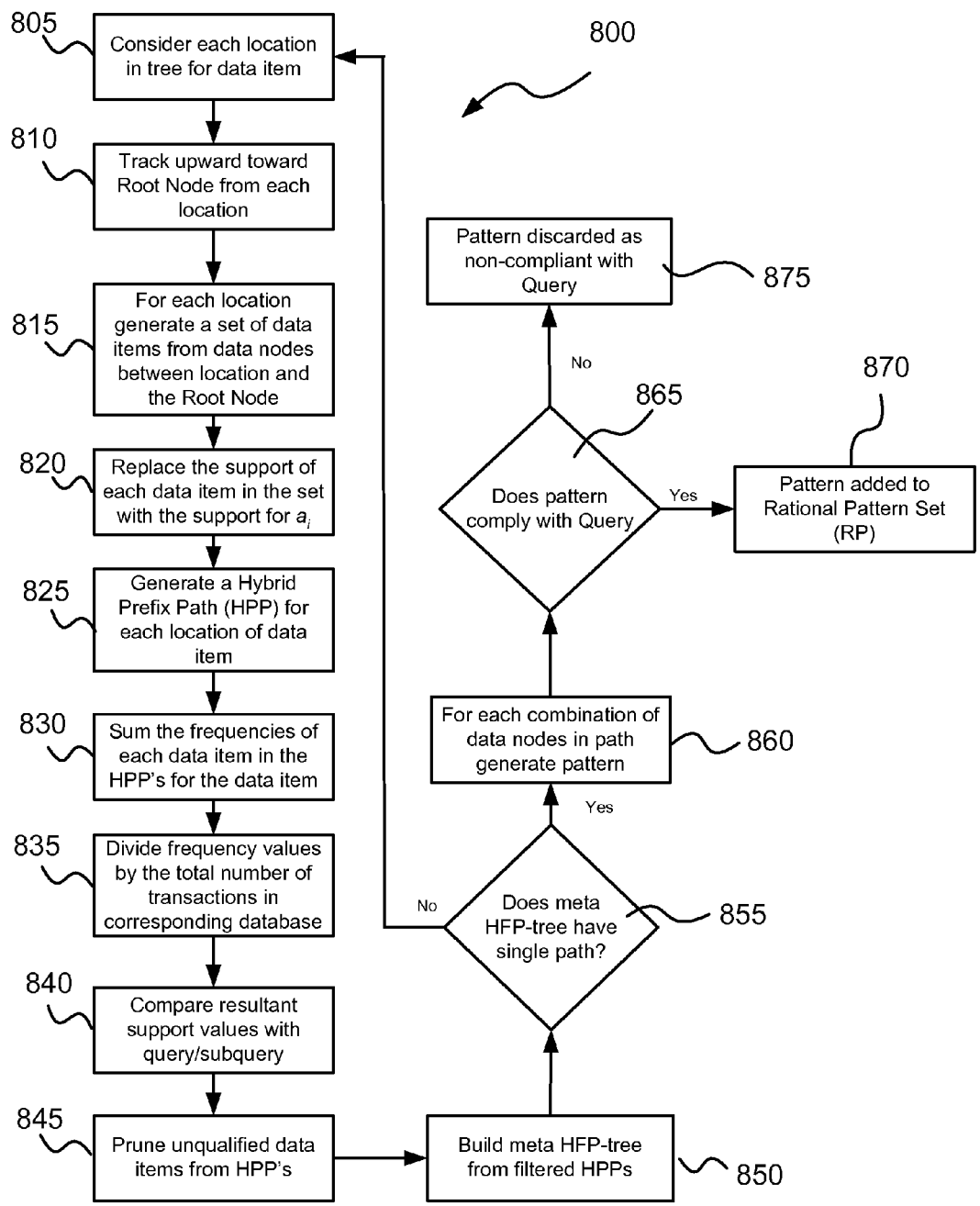
FIG. 8 illustrates another exemplary implementation of a method for determining one or more patterns from an HFP-tree.

FIG. 8 illustrates one exemplary implementation of a method 800 for pruning an HFP-tree and mining one or more relational patterns that exist across multiple databases from the support data in the HFP-tree for the multiple databases at the same time. Given an HFP-tree generated from multiple databases it is possible, in one example, to traverse the branches of the HFP-tree and identify all patterns having certain support levels across the multiple databases by considering the support for the pattern in all of the multiple databases at the same time. As discussed above, the data branches of the HFP-tree include support data for patterns from all of the databases that is interrelated such that a single view of the relationships of patterns across all of the databases is possible.

In other examples, finding all of the patterns with a minimal support across the databases may produce more patterns than is useful for a given circumstance. An HFP-tree can be utilized with a given query to determine particular patterns across the multiple databases that meet the criteria of the query. In some situations it may be advantageous to utilize the query to prune the size of the HFP-tree prior to validating particular patterns from the HFP-tree against the query. In some other situations, the size of the tree, the processing resources available, and/or other considerations may allow the full HFP-tree to be mined for pattern validation against the query. Method 800 includes one example of a pruning process and an exemplary process for validating discovered patterns against a query.

Figures 9A, 9B, 9C:
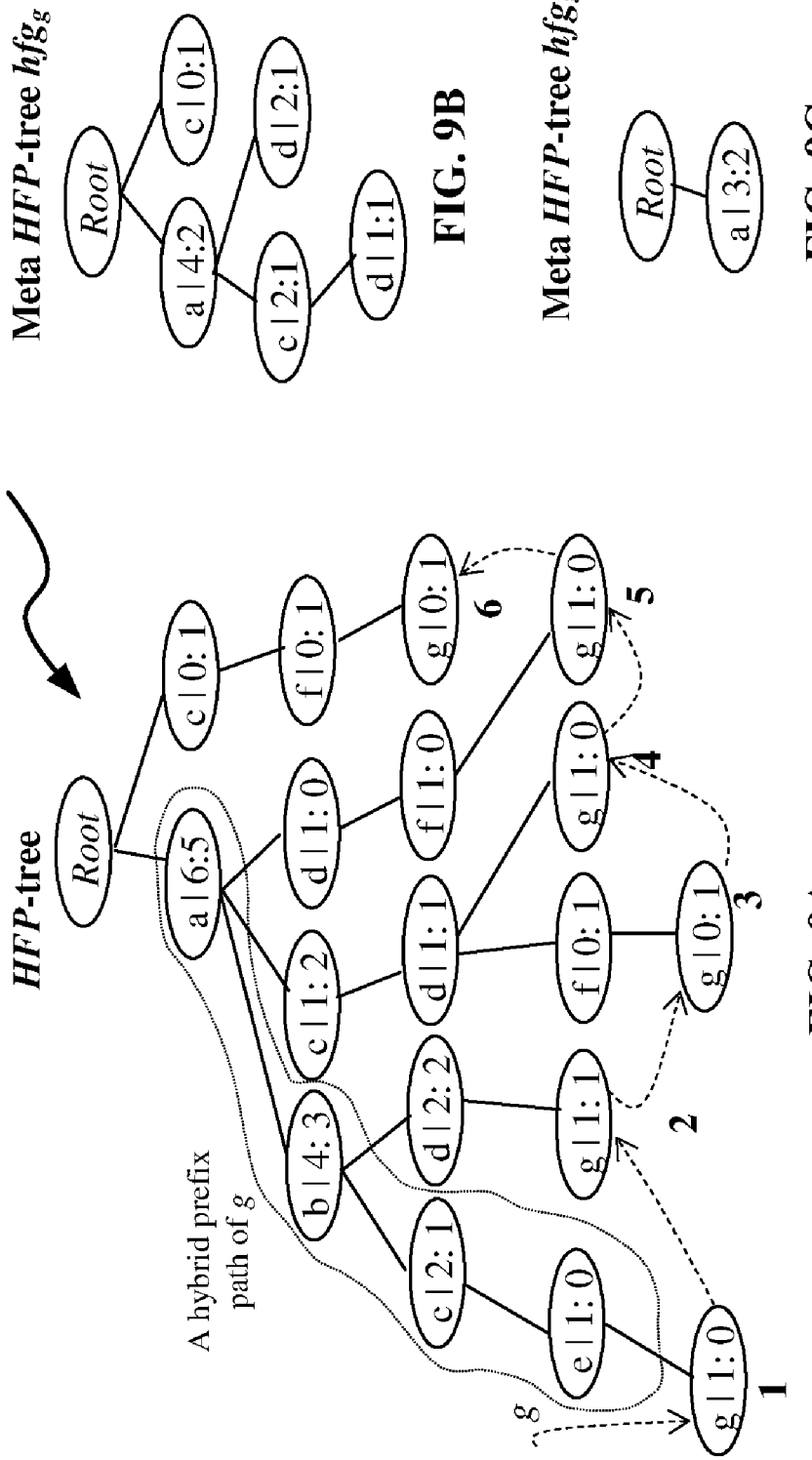
FIG. 9A illustrates one exemplary portion of the exemplary data structure of FIG. 6.
FIG. 9B illustrates one exemplary implementation of a meta HFP-tree.
FIG. 9C illustrates another exemplary implementation of a meta HFP-tree.

Given an HFP-tree generated for multiple databases and a query, method 800 may be utilized to discover patterns across the multiple databases that satisfy the query. At step 805, each data node for each data item in an HFP-tree is considered (e.g., in reverse order of the ordered master listing). In one example, in a first iteration of step 805 for a given mining process for an ordered master listing of {a, b, c, d, e, f, g}, such as the ordered master listing of HFP-tree 600 of FIG. 6 above, the first data item considered may be data item "g." Locating data nodes for a data item may be done in a variety of ways. In one example, the location ($a_i$) of each data node for a data item in an HFP-tree may be tracked in a header table to the HFP-tree. A header table may include, for example, information about the location of data nodes, the master order of data items in an HFP-tree, and any combinations thereof. FIG. 9A illustrates an exemplary portion 905 of HFP-tree 600 of FIG. 6 that includes only the data branches that terminate with a data node representing data item "g" (the last data item in the ordered master listing for HFP-tree 600) from that example set of data. Portion 905 of HFP-tree 600 is used below in examples of method 800. FIG. 9A illustrates that HFP-tree 600 includes six data nodes representing data item "g." The header table for HFP-tree 600 includes information (indicated in FIG. 9A by dotted arrows) regarding the locations ($a_i$) of these data nodes (indicated in FIG. 9A by digital number 1 to 6).

The data item being considered at step 805 has support values across the tree and across the multiple databases that can be determined by adding the support values for the data item under consideration for each of the multiple databases from all of the data nodes representing the data item being considered. A node ($n_i$) for the data item under consideration having total support values across the HFP-tree and across the databases is added to a base set, T, for the particular mining process. For example, data item "g" in HFP-tree 600 of FIG. 6 is represented by six data nodes {g|1:0}, {g|1:1}, {g|0:1}, {g|1:0}, {g|1:0}, and {g|0:1}. Adding the support values for "g" across the data nodes for each of the databases ($D_1$ and $D_2$) provides support values for data item "g": {g|4:3}. This node for "g" is added to a base set T, such that base set T={g} after the first iteration of step 805. Base set T can be expressed with support values for the data items therein as T={g|4:3}. Although this addition of a node for the data item under consideration to the base set is described here in relation to step 805, the addition of the current data item under consideration to a base set may be done at any time (e.g., at a time between from step 805 to step 860 of method 800).

At step 810, for each location $a_i$ a data branch of the HFP-tree is tracked upwardly toward the root node. In one example, location "1" for data item "g" in HFP-tree 600 has a data node {g|1:0}. The data branch tracked up to the root node includes the data nodes {e|1:0}, {c|2:1}, {b|4:3}, and {a|6:5}. At step 815, a set of data items represented by data nodes between the location $a_i$ of the data node under consideration and the root node is identified. For the example of data node {g|1:0}, the set of data items between the data node and the root node is {e, c, b, a} in the reverse order from the ordered master listing used to generate HFP-tree 600. At step 820, the support values across the multiple databases for each of the data items in the set are replaced with the support values from the data node under consideration. Note that the support values for the data nodes in the HFP-tree itself are not modified. For the example of data node {g|1:0}, the support values for data items in the set {e, c, b, a} are each replaced with the support values {1:0} from data node {g|1:0} [HFP-tree 600 retains the data nodes {e|1:0}, {c|2:1}, {b|4:3}, and {a|6:5} with the original support values].

At step 825, a hybrid prefix path ($HPP_{ij}$) for $a_i$ (with respect to the current location $l_{ij}$) is generated. An HPP describes the data items in the set for the data node under consideration with the replaced support values from the data node under consideration, each in relation to each other. For example, the HPP for data item "g" at location "1" ($HPP_{g1}$) (i.e., the HPP from data node {g|1:0} to the root node of HFP-tree 600) is {e|1:0, c|1:0, b|1:0, a|1:0}.

Steps 810 to 825 are repeated for each $a_i$ for a data item. For example, data item "g" is represented in HFP-tree 600 by six data nodes. In this example, five additional HPP's are generated for data item "g." The six exemplary HPP's, including the HPP for data node {g|1:0}, for "g" are {e|1:0, c|1:0, b|1:0, a|1:0}, {d|1:1, b|1:1, a|1:1}, {f|0:1, d|0:1, c|0:1, a|0:1}, {d|1:0, c|1:0, a|1:0}, {f|1:0, d|1:0, a|1:0}, and {f|0:1, c|0:1}.

At step 830, the frequencies (with respect to each database) of any data item in the HPP's for the data under consideration are summed across the HPP's. For example, across the six HPP's for "g" data items a, b, c, d, e, and f are represented. In this example, data item "a" appears in five of the six HPP's with support values for $D_1$ and $D_2$ in each (a|1:0, a|1:1, a|0:1, a|1:0). The summation of the frequencies for the data items of the HPP's of data item g can be expressed as $Freq_g$={a|4:2, b|2:1, c|2:2, d|3:2, e|1:0, f|0:1}.

At step 835, the frequency values are divided by the total number of transaction in each database, respectively, to produce the support values ($Sup_j$) for each data item in relation to the data item under consideration in steps 805 to 830 (e.g., producing a support value for a pattern of data items in relation to each other). In the ongoing example for consideration of data item "g" of exemplary HFP-tree 600 of FIG. 6, the total number of transactions (i.e., records) in $D_1$ is 8 and in $D_2$ is 7 (See Table 2). In this example, each of the frequency values of $Freq_g$={a|4:2, b|2:1, c|2:2, d|3:2, e|1:0, f|0:1} for $D_1$ are divided by 8 and for $D_2$ are divided by 7. For this example, $Sup_g$={a|0.5:0.29, b|0.25:0.14, c|0.25:0.29, d|0.38:0.29, e|0.13:0, f|0.13:0.29}.

At step 840, the support values for the data items in the HPP's of the data item under consideration as determined in step 835 are compared against the query/subqueries. Any data item that has a support value for any of its databases that fails comparison to the query or any subquery will not form an itemset with the data item under consideration to satisfy the query presented. The data items that fail comparison are removed from the HPP's of the data item under consideration to form filtered HPP's at step 845.

In one example, a query may itself meet the down closure property and not require decomposition to subqueries that meet the down closure property. In such an example, the query may be used in step 840. In another example, a query may be decomposed into one or more subqueries that meet the down closure property (e.g., query decomposition of step 710 of FIG. 7). In one such example, decomposition of a query may yield one or more subqueries that meet the down closure property, the subqueries being part of a down closure set (the "DC" set) for use with a procedure including the pruning an HFP-tree, such as method 800.

In one example, given a query, $Q=\{D_1 \geq D_2 \geq 0.25\}$, query decomposition may yield a DC set, such as DC={($D_1 \geq 0.25$) AND ($D_2 \geq 0.25$)}. Using this DC set with the ongoing example for data item "g" of HFP-tree 600, the support values for all data items in $Sup_g$ are compared with the DC set to determine if any of the data items fail comparison with any of the subqueries of the DC set. HFP-tree 600 includes frequency counts for all databases for data items in relation to other data items in records across D1 and D2. This frequency information correlates to the support values (e.g., as described in relation to method 800) and can be used at the same time across the databases in the mining process, here to prune the HFP-tree. Continuing with the ongoing example, the DC set requires that the support in either database be greater than or equal to 0.25. Any data item that has a support value less than 0.25 in either $D_1$ or $D_2$ with respect to data item "g" will not form an itemset with "g" to satisfy query, Q. Any such data item may be removed from the HPP's for data item "g" to form filtered HPP's for "g." Data item "b" from $Sup_g$ has a support value of 0.25 for $D_1$, which is valid for the subqueries of the example DC set. However, the support value for "b" of 0.14 for $D_2$ ({b|0.25:0.14}) does not meet either of the subqueries. Data item "b" is removed from the HPP's for data item "g." Data items {e|0.13:0} and {f|0.13:0.29} are also removed from the HPP's of data item "g." The filtered HPP's for "g" may be denoted by {c|1:0, a|1:0}, {d|1:1, a|1:1}, {d|0:1, c|0:1, a|0:1}, {d|1:0, c|1:0, a|1:0}, {d|1:0, a|1:0}, and {c|0:1}.

At step 850, the filtered HPP's from step 845 are utilized to generate a meta HFP-tree ($hfp_i$). In the ongoing example for the HPP's of data item "g" in exemplary HFP-tree 600, a meta HFP-tree ($hfp_g$) for a base set T={g} is illustrated in FIG. 9B. The meta HFP-tree of FIG. 9B was generated from the filtered HPP's for "g."

At step 855, it is determined if the current meta HFP-tree from step 850 has one or fewer paths (i.e., one or fewer data branches). If the meta HFP-tree has one or fewer paths, method 800 proceeds to step 860. If the meta HFP-tree has two or more paths, method 800 repeats steps 805 to 850 with the HFP-tree input to step 805 being the meta HFP-tree from the most recent iteration of step 850. In the ongoing example, the meta HFP-tree of FIG. 9B has three branches. In this example, the meta HFP-tree of FIG. 9B is submitted to steps 805 to 850 with data item "d" (the last data item of $hfp_g$ in the ordered master list of HFP-tree 600) to produce the meta HFP-tree ($hfp_{gd}$) for the base set T={gd} (also denoted by T={g|4:3, d|3:2}) illustrated in FIG. 9C. The support values for the data item "d" considered in the second iteration of step 805 are derived from the two data nodes of $hfp_g$ that represent data item "d," namely {d|1:1} and {d|2:1}. Considering $hfp_{gd}$ of FIG. 9C at step 855, it is determined that $hfp_{gd}$ includes only one data branch and method 800, in this example, proceeds to step 860.

At step 860, for each combination of data items represented by data nodes in the single path of the meta HFP-tree generated by the last iteration of step 850, a pattern (P) is generated.

Pattern (P) is generated by appending any of the combinations of data items from the path to the base set, T. In the ongoing example, hfp$_{gd}$ of FIG. 9C includes a single data branch having only one data node, {a|3:2}. Only one combination of data items is possible in this path, namely {a|3:2}. Data item "a" and corresponding support values from the data nodes representing data item "a" are appended to base set T (after the recursive implementation of steps 805 to 860, in this example, T={g|4:3, d|3:2}). In this example, pattern P={g|4:3, d|3:2}+{a|3:2}={g|4:3, d|3:2, a|3:2}. In one example, a pattern generated at step 860 follows the same order as used to construct the HFP-tree.

In one exemplary aspect, the final supports for a pattern P are the minimal support values of all the data items in P, with respect to each database. This can be expressed for an HFP-tree generated for two databases as follows in Equation (3):

$$P_{Sup} = \left\{ \min_{k=1,\ldots,K}\{Sup^1_{P[k]}\} : \min_{k=1,\ldots,K}\{Sup^2_{P[k]}\} \right\} \quad (3)$$

where $Sup_{P[k]}^i$ is the support value of the $k^{th}$ item in P (with respect to database $D_i$) and K is the number of items in P (remembering to express a pattern's support as a ratio of the number of appearances in D of P to the total number of transactions in D).

In the ongoing example using HFP-tree 600, the data items of exemplary pattern P={gda} ({g|4:3, d|3:2, a|3:2}) have a minimal support value for $D_1$ of 3 and a minimal support value for $D_2$ of 2. The minimal data item support values are {3:2}. Dividing these by the total number of transactions in $D_1$ and $D_2$, respectively, (see Table 2 above) gives support value of $P_{sup}$={0.38:0.28}.

example, data item "g" was considered first. The next item in the ordered master list for HFP-tree 600 is "f," which can considered through the steps of method 800 (recursively, if necessary) to build a meta HFP-tree having a one or fewer paths from which one or more patterns can be determined and applied to a query. In one example, one or more patterns determined using an HFP-tree as disclosed herein (e.g., as determined) at step 860 may be output to an output device (e.g., a display device, a printer device, a memory device, etc.) with or without subjecting the one or more patterns to query validation (e.g., query validation at step 865).

At step 865, each of the patterns discovered in step 860 and corresponding pattern support values are checked against the query to determine if the pattern satisfies the query. If the pattern satisfies the query, it is added to a relational pattern set, RP, at step 870. If the pattern does not satisfy the query, it is disregarded as not complying with the query, at step 875. In the ongoing example, the pattern P={g|4:3, d|3:2, a|3:2} with pattern support $P_{sup}$={0.38:0.28} is compared against exemplary query Q={$D_1 \geq D_2 \geq 0.25$} (as utilized in this example above) to determine that pattern P satisfies query Q and can be added to an exemplary relational-pattern set RP.

Table 4 illustrates yet another exemplary implementation of a method for pruning an HFP-tree and mining one or more relational patterns that exist across multiple databases from the support data in the HFP-tree for the multiple databases at the same time. As illustrated in Table 4, for a given HFP-tree and query, the mining procedure includes query decomposition to a DC set and HFP-growth (i.e., pruning and pattern discovery). The illustrated HFP-growth procedure includes the inputs of the HFP-tree HFP (in a first iteration); a meta HFP-tree hfp (in subsequent iterations); a relational pattern set RP, a down closure set DC, a query Q, and an ordered master listing L.

TABLE 4

Exemplary Implementation of a Method for Discovering Patterns from an HFP-tree

Input: an HFP-tree hfp built from M databases, ranking list L, and the original query Q
Output: Rational-pattern set, RP
Procedure HFP-Mining (HFP-tree, Q)
    1. Down Closure Set (DC) ← Query-Decomposition (Q)
    2. RP ← Ø , T ← Ø
    3. HFP-growth (HFP-tree, T, RP, DC, Q, L)
Procedure HFP-growth (hfp, T, RP, DC, Q, L)
    For each node $n_i$ in the header table of hfp (in inverse order of the ranking list L)
        a. $S_i$ ← Ø; T ← T ∪ $n_i$. The supports of T are the minimal support values of all the
           nodes in T (w.r.t. each database)
        b. For each of $n_i$'s location $a_{ij}$ in the header table of hfp
           i. Build a hybrid prefix path, $HPP_{ij}$, for $a_{ij}$,
           ii. $S_i$ ← $S_i$ ∪ $HPP_{ij}$
        c. Prune items in $S_i$ based on the down closure rule in the DC set
        d. Build a meta HFP-tree, $hfp_i$, based on the remaining items in $S_{ij}$ and ranking list L
        e. If $hfp_i$ contains a single path PS
           i. For each combination (denoted by π) of the nodes in the path PS
               1. Generate pattern P ← T ∪ π, the supports of P are the minimal
                  support values of the node in π (w.r.t. each database)

$$P_{Sup} = \left\{ \min_{k=1,\ldots,K}\{Sup^1_{P[k]}\} : \ldots : \min_{k=1,\ldots,K}\{Sup^M_{P[k]}\} \right\}, \text{ where } Sup^i_{P[k]} \text{ means the support}$$

value of the $k^{th}$ item in P (w.r.t. to database $D_i$) and K is the number of items in P
           2. Check whether P complies with the query Q; if it does, RP ← RP ∪ P
        f. Else
           i. HFP-growth ($hfp_i$, T, RP, DC, Q, L)

Steps 805 to 860 are repeated for each data item represented in the HFP-tree to determine additional patterns. In one exemplary aspect, this is done for each data item in reverse order used to build the HFP-tree. In the ongoing It is to be noted that the aspects and embodiments described herein may be conveniently implemented using a machine (e.g., a general purpose computing device) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art.

Such software may be a computer program product that employs a machine-readable medium. A machine-readable medium may be any medium that is capable of storing and/or encoding a sequence of instructions for execution by a machine (e.g., a computing device) and that causes the machine to perform any one of the methodologies and/or embodiments described herein. Examples of a machine-readable medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof. In one example, a general purpose computing device may include and/or be included in, a kiosk.

Figure 10:
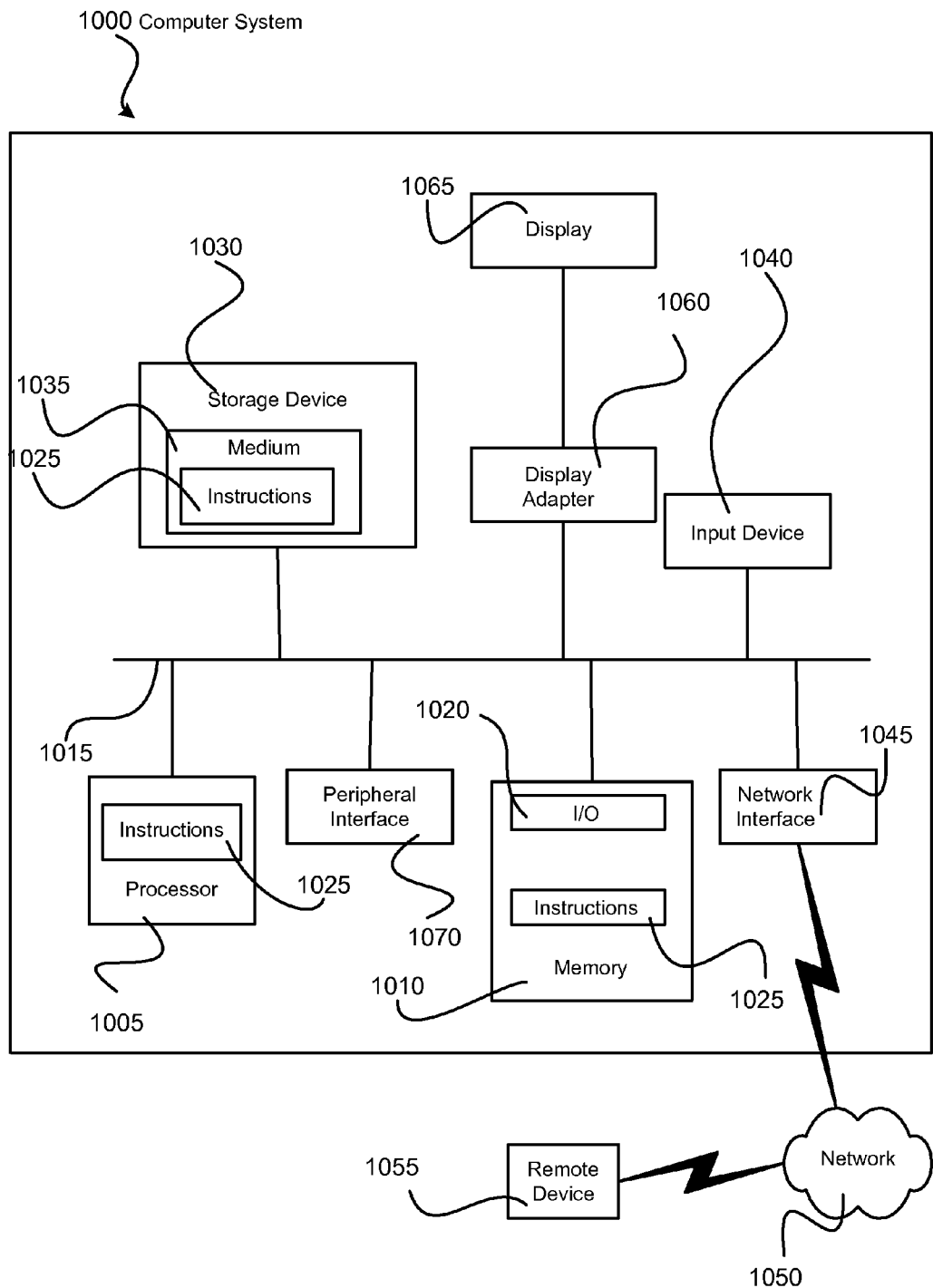
FIG. 10 illustrates one exemplary computing environment for a system and/or method of discovering one or more relational patterns across multiple databases.

FIG. 10 shows a diagrammatic representation of one embodiment of a general purpose computing device in the exemplary form of a computer system 1000 within which a set of instructions for causing the device to perform any one or more of the aspects and/or methodologies of the present disclosure may be executed. Computer system 1000 includes a processor 1005 and a memory 1010 that communicate with each other, and with other components, via a bus 1015. Bus 1015 may include any of several types of bus structures including, but not limited to, a memory bus, a memory controller, a peripheral bus, a local bus, and any combinations thereof, using any of a variety of bus architectures.

Memory 1010 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 1020 (BIOS), including basic routines that help to transfer information between elements within computer system 1000, such as during start-up, may be stored in memory 1010. Memory 1010 may also include (e.g., stored on one or more machine-readable media) instructions (e.g., software) 1025 embodying any one or more of the aspects and/or methodologies of the present disclosure. In another example, memory 1010 may further include any number of program modules including, but not limited to, an operating system, one or more application programs, other program modules, program data, and any combinations thereof.

Computer system 1000 may also include a storage device 1030. Examples of a storage device (e.g, storage device 1030) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 1030 may be connected to bus 1015 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1030 may be removably interfaced with computer system 1000 (e.g., via an external port connector (not shown)). Particularly, storage device 1030 and an associated machine-readable medium 1035 may provide nonvolatile and/or volatile storage of machine-readable instructions, data structures, program modules, and/or other data for computer system 1000. In one example, software 1025 may reside, completely or partially, within machine-readable medium 1035. In another example, software 1025 may reside, completely or partially, within processor 1005.

Computer system 1000 may also include an input device 1040. In one example, a user of computer system 1000 may enter commands and/or other information into computer system 1000 via input device 1040. Examples of an input device 1040 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 1040 may be interfaced to bus 1015 via any of a variety of interfaces (not shown) including, but not limited to, a serial interface, a parallel interface, a game port, a USB interface, a FIREWIRE interface, a direct interface to bus 1015, and any combinations thereof.

A user may also input commands and/or other information to computer system 1000 via storage device 1030 (e.g., a removable disk drive, a flash drive, etc.) and/or a network interface device 1045. A network interface device, such as network interface device 1045 may be utilized for connecting computer system 1000 to one or more of a variety of networks, such as network 1050, and one or more remote devices 1055 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 1050, may employ a wired and/or a wireless mode of communication. In general, any network topology may be used. Information (e.g., data, software 1025, etc.) may be communicated to and/or from computer system 1000 via network interface device 1045.

Computer system 1000 may further include a video display adapter 1060 for communicating a displayable image to a display device, such as display device 1065. Examples of a display device include, but are not limited to, a liquid crystal display (LCD), a cathode ray tube (CRT), a plasma display, and any combinations thereof. In addition to a display device, a computer system 1000 may include one or more other peripheral output devices including, but not limited to, an audio speaker, a printer, and any combinations thereof. Such peripheral output devices may be connected to bus 1015 via a peripheral interface 1070. Examples of a peripheral interface include, but are not limited to, a serial port, a USB connection, a FIREWIRE connection, a parallel connection, and any combinations thereof.

A digitizer (not shown) and an accompanying pen/stylus, if needed, may be included in order to digitally capture freehand input. A pen digitizer may be separately configured or coextensive with a display area of display device 1065. Accordingly, a digitizer may be integrated with display device 1065, or may exist as a separate device overlaying or otherwise appended to display device 1065.

EXPERIMENTAL EXAMPLES

Several experimental evaluations and a comparative study with two simple solution based relational-pattern discovery mechanisms were conducted. The test datasets were collected from two sources: (1) synthetic databases generated by using an IBM Quest data generator; and (2) the IPUMS (Integrated Public Use Microdata Series) 2000 USA census micro-data with 1% sampling rate. All of the experiments were performed on a 2.0 GHz Pentium PC machine with 512 MB main memory. All of the programs (e.g., machine executable instructions) were written in C++, with the integration of an STL-like C++ tree class to fulfill the tree construction and access. A system and/or method of discovering relational patterns from multiple databases using an HFP-tree as disclosed above is referred to as DRAMA (Discovering Relational patterns Across Multiple dAtabases) in the following discussions of experimental examples. Although it is possible for DRAMA to reuse a previously constructed HFP-tree to answer multiple queries, for fairness in comparison, DRAMA initiated HFP-tree construction and HFP-mining for each query in the following examples. In the following tables and figures, unless specified otherwise, the runtime always refers to the total execution time, i.e., the tree construction plus the mining time.

For a comparative study, we implemented two simple prior art solutions, SPV and CPM. While SPV sequentially mines and verifies patterns from each database, CPM generates candidates from each component database, and refers to the collaborative mining process for candidate pruning. For SPV, we used FP-tree instead of the Apriori algorithm to mine patterns from the first database. Because CPM needs candidates generated at each single database for collaborative mining, we applied the traditional Apriori algorithm on each database. The runtime of CPM was the pattern mining time of the databases with the largest time expense plus the time for collaborative mining and pattern verification.

Because real-world databases can vary significantly in size, we generated four synthetic databases with different sizes, as shown in Table 5. The explanations of the database description can be found in R. Agrawal & R. Srikant, Fast algorithms for mining association rules, *Proc. of VLDB*, 1994, the portions of which that describe these databases are incorporated herein by reference in their entirety. In short, T10.I6.D300k.N1000.L1000 means a database with 300,000 transactions and 1000 items, where each transaction contains 10 items, and each pattern contains 6 items on average. It is understandable that the runtime of the systems relied on the underlying queries. For an objective assessment, we defined five queries, as shown in Table 6, and demonstrated the average system runtime performances in answering these queries.

TABLE 5

Synthetic Database Characteristics

| Database | Database description |
|---|---|
| $D_1$ | T10.I6.D300k.N1000.L1000 |
| $D_2$ | T10.I6.D200k.N1000.L1000 |
| $D_3$ | T10.I6.D100k.N1000.L1000 |
| $D_4$ | T10.I6.D50k.N1000.L1000 |

TABLE 6

Query Plan Description

| Query | Query constraints |
|---|---|
| $Q_1$ | $\{D_1 \geq D_2 \geq D_3 \geq \alpha\}$ |
| $Q_2$ | $\{(D_1 + D_2) \geq \alpha\} | \{(D_3 + D_4) \geq \alpha\}$ |
| $Q_3$ | $\{(D_1 - D_2) \geq (D_3 - D_4) \geq \alpha\}$ |
| $Q_4$ | $\{D_1 \geq (D_2 | D_3) \geq \alpha\} \& \{D_4 \leq \beta\}$ |
| $Q_5$ | $\{|D_1 - D_2| \geq (D_3 + D_4) \geq \alpha\}$ |

Figure 11:
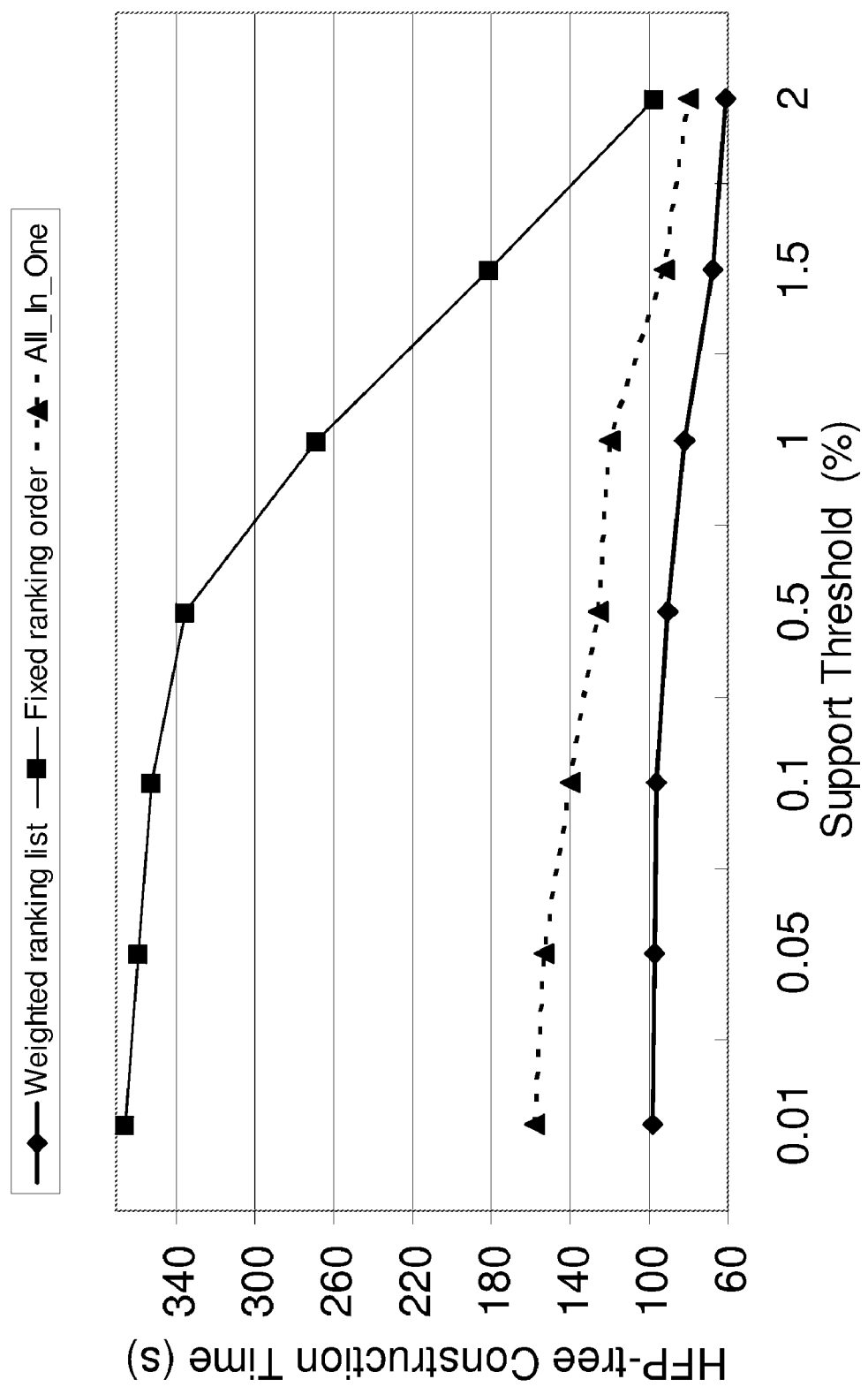
FIG. 11 illustrates one exemplary plot of experimental data obtained from various exemplary implementations.
Figure 12:
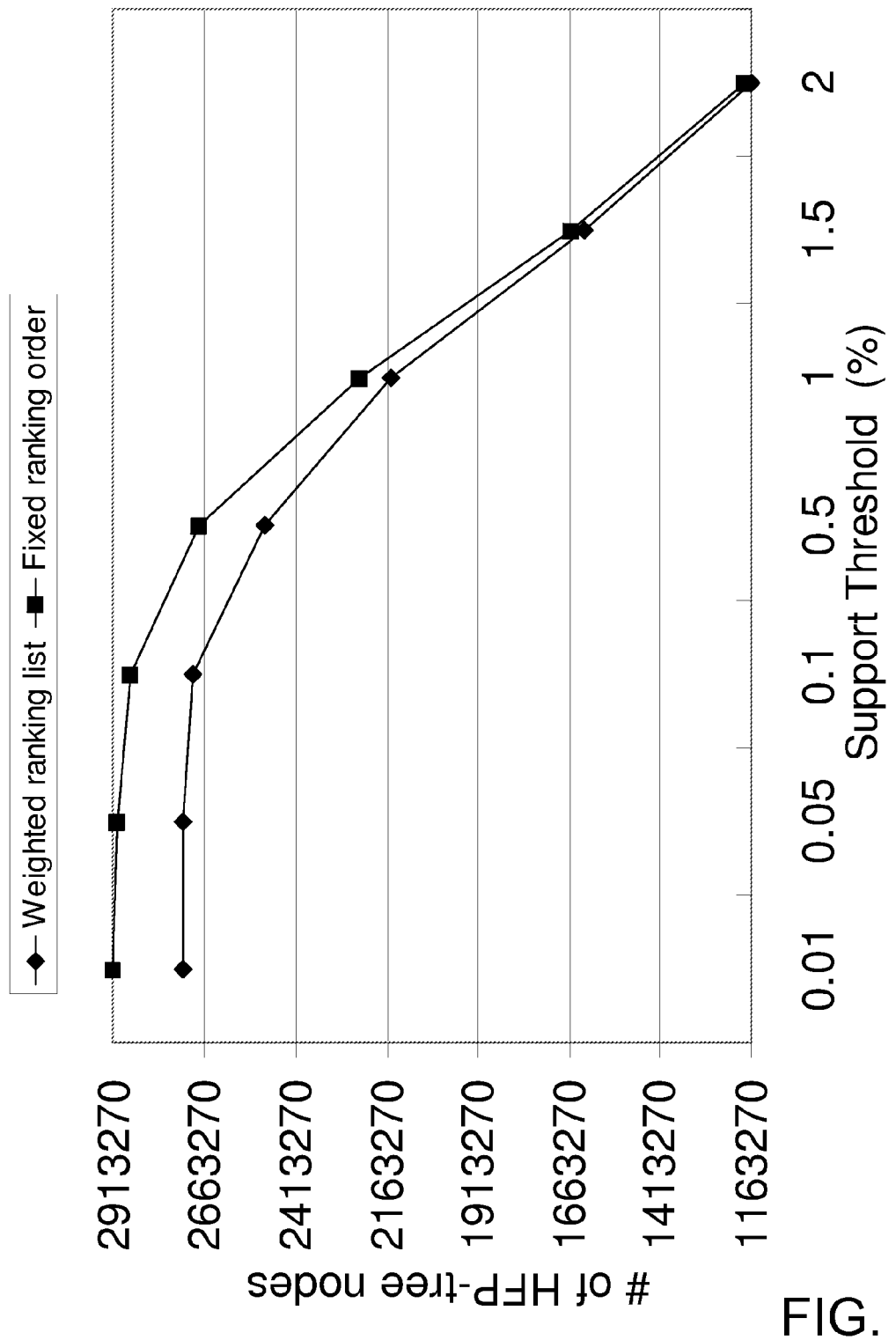
FIG. 12 illustrates another exemplary plot of experimental data obtained from various exemplary implementations.
Figure 13:
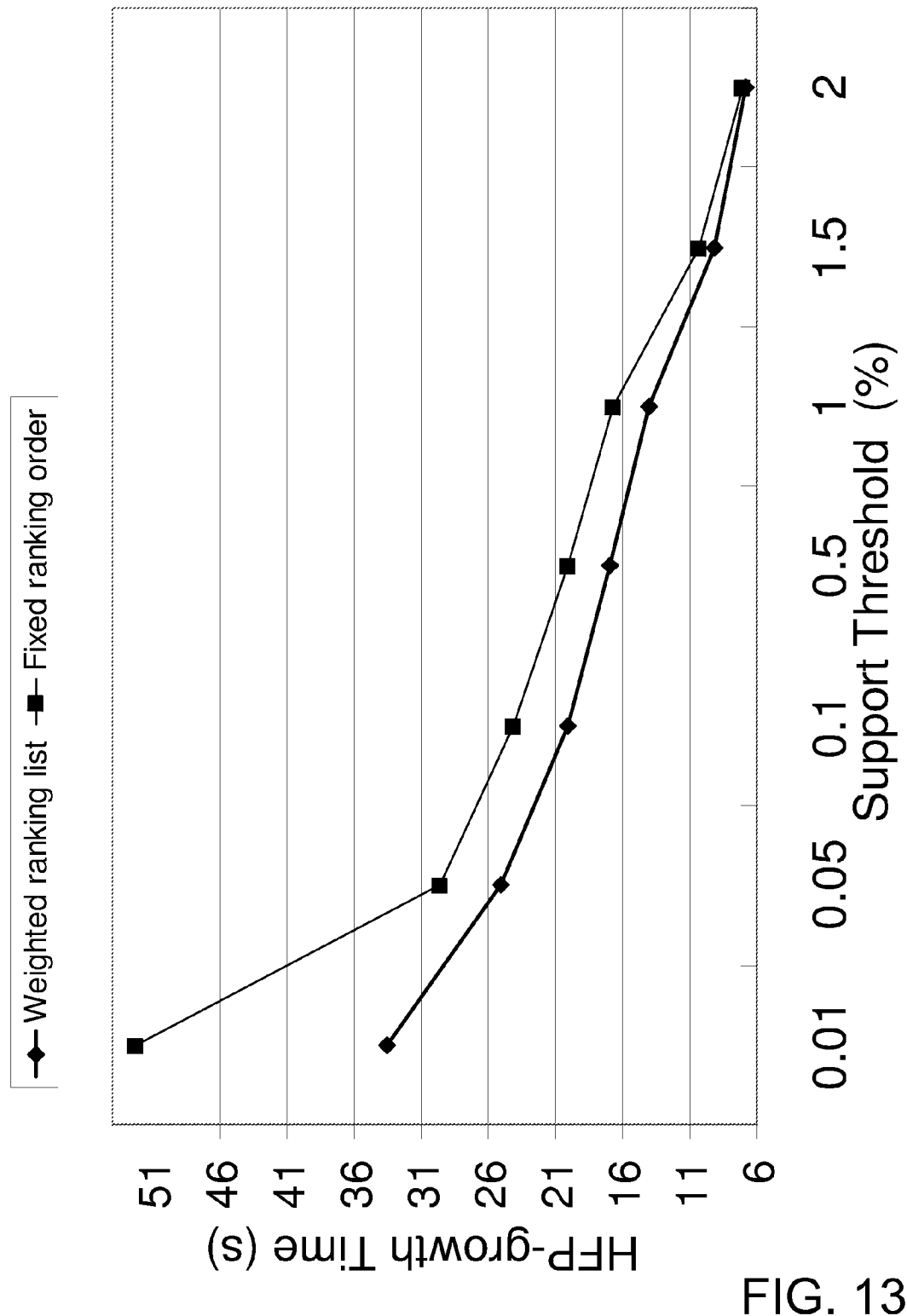
FIG. 13 illustrates yet another exemplary plot of experimental data obtained from various exemplary implementations.

A joint ranking list which ranks items from different databases for HFP-tree construction was discussed above with respect to Equations (1) and (2). The performance of such a ranking mechanism in facilitating tree construction and pattern growth processes was investigated. $Q_1$ in Table 6 was applied on the synthetic databases, and both a joint ranking list and a fixed ranking list were utilized to build HFP-trees. A joint ranking list is a ranking list that takes into consideration the ranking information of each item with respect to each individual database (e.g., the data items are ranked within the databases and the ranking is used to build the master ranking). Two examples of a joint ranking list are given above in Equations (1) and (2). A fixed ranking list is simply ordering the data items without consideration of item frequency information (e.g., alphabetically). The results of this assessment are shown in FIGS. 11 to 13. FIG. 11 denotes the comparison of the HFP-tree construction time for various threshold values for HFP-trees generated using (a) a weighted ranking list (using Equation (2) from above), (b) a fixed ranking order, and (c) an all-in-one ranking order (i.e., a global ranking listing which combines the frequency of items over all databases and then ranks them). FIG. 12 represents the comparison of the total number of HFP-tree interior nodes for exemplary HFP-trees generated with various threshold values and using (a) a weighted ranking list and (b) a fixed ranking order. FIG. 13 reports the comparison of the HFP-growth time for the exemplary HFP-trees generated. In all figures, the x-axis denotes the support threshold $\alpha$ in $Q_1$ (which was used as an initial threshold value in determining which data items to include in HFP-tree construction and was used in the queries), and the y-axis denotes the results of different measures.

As shown in FIG. 11, the proposed joint ranking list dramatically reduced the time in building an HFP-tree from multiple databases, where the lower the support threshold $\alpha$, the more significant the improvement was observed. When $\alpha=2\%$, it cost the fixed ranking list and joint ranking list about 98 seconds and 60 seconds, respectively, to build the HFP-tree; on the other hand, when $\alpha$ becomes significantly low, say 0.01%, the cost of the joint ranking list increased to about 98.5 seconds, which is about 3.5 times less than the time of the fixed ranking list (364.8 seconds). A low α value will have most items in the database become frequent, and therefore be added into an HFP-tree. This can be very time consuming, if the inserting process does not take item frequency information into consideration, because each item needs to check with the existing HFP-tree to find whether the current path already contains this item or not. The more the frequent items, the fatter the HFP-tree, and the more time is going to be spent on this process. On the other hand, a ranking order which unifies the item frequency information from all databases can significantly reduce the time in inserting each transaction into the HFP-tree, because each item a will have less search space in verifying whether the current node (of the HFP-tree) already contains a or not. In addition, since the joint ranking list has items sorted by their frequencies before they were inserted into the HFP-tree, it will have a better chance, compared to the fixed ranking list, to force items in a frequent itemset to follow a single path, and consequently can reduce the size of the constructed HFP-tree. As shown in FIG. 12, the interior node number of the HFP-tree built from the joint ranking list was about 1% to 10% less than the tree built from the fixed ranking list. The HFP-tree quality improvement (more compact and less interior nodes) may allow the HFP-growth process to grow faster in finding frequent patterns, as shown in FIG. 13.

The joint ranking list unifies the ranking order of each item from different databases. An alternative method might include treating all items as they were from one single database, e.g., $D=D_1+D_2+D_3$, and then ranking the items according to their total frequencies (with infrequent items in each database removed beforehand), just like the traditional FP-tree method does. However, such a global ranking list reviews items as they come from a single database without considering their frequencies in each single database, which may produce a list inferior to the one from the joint ranking list. For example, if the frequencies of items {a, b, c} in $D_1$ and $D_2$ are {3000, 1000, 900} and {100, 2000, 1000}, respectively. A global ranking list will sum up each item's frequency and produce the list L=abc. On the other hand, a joint ranking list will produce the list L=bac. Considering that the most possible frequent itemsets in $D_1$ and $D_2$ are {bc} instead {ac} or {ab}, the joint ranking list may lead to better results in reality. FIG. 11 also reports the HFP-tree construction time of a global ranking list, which further supports our analysis. The HFP-growth on the tree built from the global ranking list also needed more time than the one built from the joint ranking list, the results from this mechanism were omitted from FIGS. 12 and 13.

Figure 14:
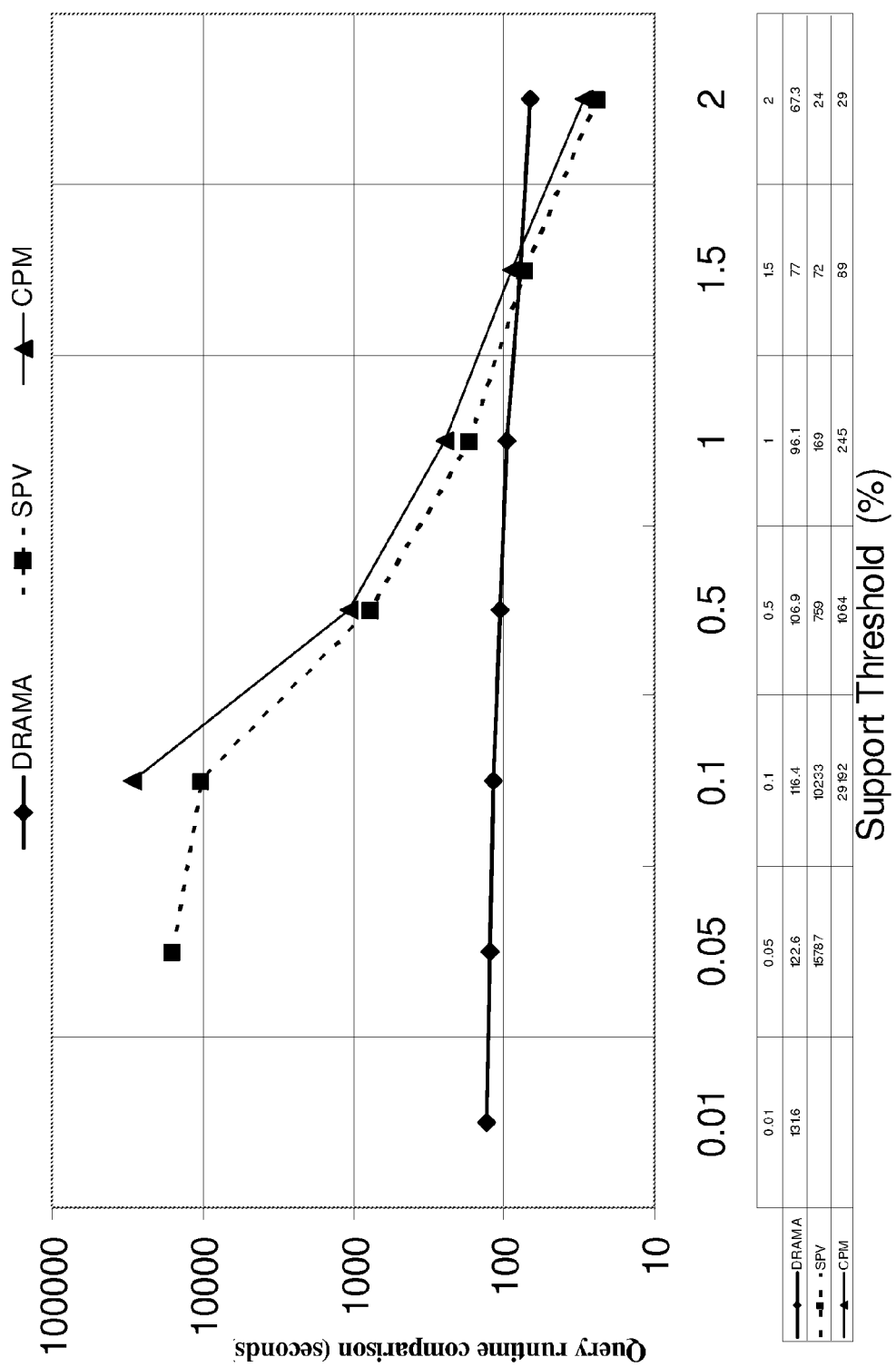
FIG. 14 illustrates one exemplary plot of experimental data obtained from a comparative analysis various exemplary implementations.

FIG. 14 reports a detailed runtime performance comparison between DRAMA and two simple solutions (SPV and CPM) on $Q_1$ in Table 6, where the x-axis denotes the support threshold value α and the y-axis represents the system runtime in seconds. For a detailed comparison, the actual value of each method is also listed in the figure. When the threshold value was relatively small, e.g., 0.05% or 0.01%, the runtimes of SPV and CPM were extremely large. This data was omitted from the figure as it was not fit for comparison.

Overall, DRAMA linearly responded to the threshold value α and did an excellent job in answering the query $Q_1$. When the value of α was larger than 1.5%, it was noticed that DRAMA performed more slowly. A further study showed that for large α values, the time for HFP-tree construction became significant, compared to the time for HFP-growth. For example, when α=1.5%, DRAMA spent about 68 seconds on building the HFP-tree; however, it only costs about 9 seconds for the HFP-growth to mine the patterns.

At this support value level, SPV applied an FP-tree based algorithm on $D_1$, which output only 96 patterns for $D_2$ to verify. So the performance of SPV at α=1.5% was really just the runtime of the FP-tree mining on $D_1$. On the other hand, when the threshold value decreased, the patterns generated from $D_1$ significantly increased, which may have led to a huge runtime expense for $D_2$ to verify these patterns (notice that database scanning for pattern verification can be very expensive, especially for large databases). For example, when α=0.1%, $D_1$ will generate about eighty thousand patterns under SPV which need to be verified by $D_2$, among which about ten thousands patterns further needed to be verified by $D_3$. As shown in FIG. 14, the sequential verification mechanism of SPV needed more than ten thousand seconds to check all those patterns. For DRAMA, although the tree construction at this level (α=0.1%) cost about 96 seconds, the integrated pattern pruning mechanism significantly reduced the HFP-growth time to about 20 seconds only. So in total, DRAMA answered $Q_1$ in about 106 seconds, which is a huge improvement compared to SPV.

The results in FIG. 14 indicate that SPV outperformed CPM. Because CPM needs multiple databases to forward their candidates to a central place for collaborative mining (by pruning unqualified candidates), Apriori was applied on each single database. The system performance of CPM was crucially bounded by the poor performance of Apriori based algorithms. When the support value α was large, e.g., 2%, the performance of Apriori and FP-tree was almost identical (since not many items can be frequent). However, for small α values, the situation can be totally different. For example, when α=0.1%, about 680 items in $D_1$ were frequent, which produced more than 230 thousand length-2 patterns from $D_1$ (although collaborative pattern pruning can somewhat remove some candidates, it still leaves a large number of candidates for $D_1$ to evaluate). This huge burden significantly slowed down the performance of CPM, and made it almost unbearable in answering many queries. It is noted that some queries like $Q_2$ in Table 6 cannot be answered by SPV, because no mining from a single database can produce answers for $Q_2$. DRAMA performed well with such queries.

Both DRAMA and CPM can possibly answer a query like $Q_2$ by using a collaborative mining and pattern pruning process, where only patterns with their support satisfying $(D_1+D_2)\geq\alpha$ or $\{(D_3+D_4)\geq\alpha$ are kept for further actions. For DRAMA, instead of prefiltering any single infrequent items before the HFP-tree construction, an HFP-tree can be built by using all items in the transactions, and then letting HFP-growth prune out the candidates on the fly. This mechanism turns out to be very efficient in reality, as the HFP-tree construction in this case spent only 105 seconds (which is about 7 seconds more than α=0.01%). As shown in Table 7 (where the value of α is fixed to 0.5%), the run time performance of DRAMA was much better than CPM in answering $Q_2$. Table 7 has further listed a runtime comparison between DRAMA and CPM in answering other queries in Table 3, with the performance of DRAMA consistently and significantly better than CPM for all the queries.

TABLE 7

Query runtime comparison on $Q_2$, $Q_3$, $Q_4$, and $Q_5$ in Table 3 (α = 0.5%, β = 0.01%)

| Algorithm | $Q_2$ | $Q_3$ | $Q_4$ | $Q_5$ |
| --- | --- | --- | --- | --- |
| DRAMA | 157.1 | 135.6 | 129.5 | 147.7 |
| CPM | 3172 | 1125 | 1094 | 2957 |

To further assess the system performance of DRAMA on real-world datasets, the US 2000 census micro-data, which provides census information about the US residents (individuals and households) was evaluated. A 1% sample of the year 2000 census data with forty seven attributes was used. Those attributes covered age, household/personal income, education, race, citizenship, poverty, and family relationship etc. Because many attributes contained multiple attribute values, and some attributes were numerical, each continuous attribute was discretized and the total attribute extended to 587 distinct items. Data from four states (California, New York, Florida, and Vermont) were used, corresponding to datasets CA, NY, FL, and VT. Depending on the number of populations in each state, the size of the dataset varied from 6000 (Vermont) to over 330,000 records (California).

Table 8 reports a runtime performance comparison among DRAMA, CPM, and SPV, with dataset settings $D_1$=CA, $D_2$=NY, $D_3$=VT, and $D_4$=FL, and two sets of support threshold values. Because SPV was not able to answer $Q_2$ and $Q_5$, its results in the corresponding cells are set to N/A. Because census data was not randomly generated (like the synthetic data), item frequencies were not random with many items' frequencies significantly higher than others. So the support threshold values ($\alpha$ and $\beta$) chosen were relative high. But even so, it is noticed that DRAMA consistently outperformed both SPV and CPM with a significant runtime improvement. The results in Table 8 indicate that different from the synthetic data, CPM actually had a much better performance than SPV in answering some queries. In fact, when $\alpha$=40% and $\beta$=5%, although it will cost FP-tree mining about 5 seconds to mine patterns from $D_1$, there was over ten thousand patterns generated from $D_1$ with the longest pattern containing 13 items. All these patterns needed to be verified by $D_2$, which increased the runtime significantly. On the other hand, at the same threshold level, there were about eighty frequent items in $D_1$, which produced about thirty two hundred length-2 candidates for CPM. Meanwhile, the collaborative pattern pruning from multiple databases pruned out unnecessary candidates

TABLE 8

| Query Runtime Comparison on IPUMS Census Data | | | | | | |
|---|---|---|---|---|---|---|
| Threshold | Algorithm | $Q_1$ | $Q_2$ | $Q_3$ | $Q_4$ | $Q_5$ |
| $\alpha$ = 25% | DRAMA | 25.3 | 37.4 | 24.3 | 21.3 | 39.6 |
| $\beta$ = 10% | CPM | 679 | 931 | 866 | 784 | 901 |
| | SPV | 3123 | N/A | 3201 | 3194 | N/A |
| $\alpha$ = 40% | DRAMA | 18.1 | 30.9 | 17.8 | 17.6 | 33.2 |
| $\beta$ = 5% | CPM | 347 | 492 | 362 | 273 | 419 |
| | SPV | 1192 | N/A | 1049 | 901 | N/A |

In one exemplary aspect, an example of a system and/or method as described herein may unify all databases considered in a query to fulfill a pattern discovery process (e.g., by not mining from individual databases without consideration of all of the other databases at the same time, such as by considering the support values of all of the databases in the same data structure). In another exemplary aspect, an example of a system and/or method as described herein may allow the solving of complex queries (e.g., queries that include more than one database explicitly specified in relation to a single threshold value, such as queries 2 and 5 in Table 6. In yet another exemplary aspect, an example of a system and/or method as described herein may allow scaling with good performance to large data volumes and easily extend to discover relational patterns other than frequent itemsets.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computerized method of identifying relational patterns that exist across a plurality of databases, each of the plurality of databases including one or more records having one or more data items of interest, the method comprising:

generating a hybrid frequent pattern tree from one or more records from each of the plurality of databases, the hybrid frequent pattern tree including one or more data node branches having one or more data nodes, each of the one or more data nodes representing one of the one or more data items of interest, the one or more data nodes of each of the one or more data node branches representing data items that are related to each other in records of the plurality of databases, each of the one or more data nodes having the following form: $\{x|y_1: \ldots :y_M\}$, where M is the number of the plurality of databases, x is a data item indicator for the one of the one or more data items of interest that is represented by the data node, $y_1, \ldots, y_M$ are data item support counters indicating the number of times that data item x appears in databases $D_1, \ldots, D_M$, respectively, in relation to other data items represented in the data branch having the data node; and mining the hybrid frequent pattern tree to identify one or more relational patterns that exists across the plurality of databases by considering pattern support data across the plurality of databases at the same time, the pattern support data based on the data item support data for the plurality of databases in the data item support counters of the hybrid frequent pattern tree, wherein said mining includes determining a pattern P including pattern data items and corresponding pattern data item support values derived from the one or more branches where the support for the pattern across the plurality of databases is determined according to:

$$P_{Sup} = \left\{ \min_{k=1,\ldots,K}\{Sup^1_{P[k]}\} : \ldots : \min_{k=1,\ldots,K}\{Sup^M_{P[k]}\} \right\}$$

where $Sup_{P[k]}^i$ is the support value of the $k^{th}$ data item in P (with respect to database $D_i$) and K is the number of items in P, M represents the number of the plurality of databases, $D_i$ represents each of the plurality of databases where i=1, ..., M.

2. the method according to claim 1, further comprising generating an ordered master listing of the one or more data items of interest existing in the plurality of databases, each of the one or more data nodes of one of the one or more data branches organized in the same order as the ordered master listing.

3. the method according to claim 2, wherein said generating an ordered master listing includes ranking the one or more data items of interest across the plurality of databases according to the following equation:

$$\overline{R}^j = \frac{1}{M}\sum_{i=1}^{M} R_i^j$$

wherein M represents the number of the plurality of databases, $D_i$ represents each of the plurality of databases where i=1, ..., M, N represents the number of data items of interest ($I_j$, where j=1, ..., N) in the plurality of databases, $R_i^j$ represents the ranking order of data item $I_j$ in database $D_i$, and the final ranking order of the ordered master listing is constructed by ranking $\overline{R}^j$, j=1, 2, ... N, in an ascending order.

4. the method according to claim 2, wherein said generating an ordered master listing includes ranking the one or more data items of interest across the plurality of databases according to the following equation:

$$\overline{R}^j = \frac{1}{M}\sum_{i=1}^{M}\frac{S-S_i}{S}R_i^j$$

wherein M represents the number of the plurality of databases, $D_i$ represents each of the plurality of databases where i=1, ..., M, N represents the number of data items of interest ($I_j$, where j=1, ..., N) in the plurality of databases, $R_i^j$ represents the ranking order of data item $I_j$ in database $D_i$, $S_i$ is the number of records in $D_i$, $S=S_1+S_2+...+S_M$ represents the total number of transactions, and the final ranking order of the ordered master listing is constructed by ranking $\overline{R}^j$, j=1, 2, ... N, in an ascending order.

5. the method according to claim 1, wherein said generating a hybrid frequent pattern tree includes:
   generating an ordered master listing of the one or more data items of interest existing in the plurality of databases; and
   for each record in the plurality of databases,
      identifying a set of data items from the record that correspond to data items in the ordered master listing;
      ordering the set of data items in the same order as the data items in the ordered master listing;
      generating a data node branch representative of the set of data items, the data node branch including a data node for each data item of the set of data items, each data node in the data node branch including a data item indicator corresponding to one of the data items and a counter for each of the plurality of databases for tracking occurrences of data items in the plurality of databases at the same time, wherein said generating a data node branch includes:
         determining if a first level data node exists directly linked to a root node having a data item indicator corresponding to the first data item in the ordered set of data items;
         if not, creating a first data node having a data item indicator corresponding to the first data item and a counter for each of the plurality of databases, incrementing the counter of the first data node that corresponds to the database of the record, and setting the first data node as the current node;
         if so, incrementing the counter that corresponds to the database of the record for the first level data node and setting the first level data node as the current node; and
      determining for each subsequent data item in the order of the set of data items if there is a subsequent data node directly linked to the current node having a data item indicator corresponding to the subsequent data item in the order of the set of data items;
         if not, creating a subsequent data node linked to the current data node in the data node branch, the subsequent data node having a data item indicator corresponding to the subsequent data item and a counter for each of the plurality of databases, incrementing the counter of the subsequent data node that corresponds to the database of the record, and setting the subsequent data node as the current node;
         if so, incrementing the counter that corresponds to the database of the record for the subsequent data node and setting the subsequent data node as the current node.

6. A system for identifying relational patterns that exist across a plurality of databases, each of the plurality of databases including one or more records having one or more data items of interest, the method comprising:
   a plurality of databases;
   means for generating a hybrid frequent pattern tree from the one or more records of the plurality of databases, the hybrid frequent pattern tree including one or more data node branches, each of the one or more data node branches including one or more data nodes, each of the one or more data nodes representing a data item of interest and corresponding data item support values for the data item across the plurality of databases in relation to other data items represented in the data node branch, said means for generating a hybrid frequent pattern tree operatively connected to said plurality of databases, each of the one or more data nodes having the following form: $\{x|y_1: ...: y_M\}$, where M is the number of the plurality of databases, x is a data item indicator for the one of the one or more data items of interest that is represented by the data node, $y_1, ..., y_M$ are data item support counters indicating the number of times that data item x appears in databases $D_1, ..., D_M$, respectively, in relation to other data items represented in the data branch having the data node;
   means for mining the hybrid frequent pattern tree to identify one or more relational patterns that exists across the plurality of databases by considering the data item support values across the plurality of databases at the same time and determining pattern support values for the one or more relational patterns across the plurality of databases, wherein said mining includes determining a pattern P including pattern data items and corresponding pattern data item support values derived from the one or more branches where the support for the pattern across the plurality of databases is determined according to:

$$P_{Sup} = \left\{\min_{k=1,...,K}\{Sup_{P[k]}^1\}: ...: \min_{k=1,...,K}\{Sup_{P[k]}^M\}\right\}$$

where $\text{Sup}_{P[k]}^{i}$ is the support value of the $k^{th}$ data item in P (with respect to database $D_i$) and K is the number of items in P, M represents the number of the plurality of databases, $D_i$ represents each of the plurality of databases where i=1, ..., M; and means for outputting the one or more relational patterns.

7. the system according to claim 6, further comprising a means for generating an ordered master listing of the one or more data items of interest existing in the plurality of databases, each of the one or more data nodes of one of the one or more data branches organized in the same order as the ordered master listing.

8. the system according to claim 7, wherein said ordered master listing is ordered according to the following equation:

$$\overline{R}^j = \frac{1}{M}\sum_{i=1}^{M} R_i^j$$

wherein M represents the number of the plurality of databases, $D_i$ represents each of the plurality of databases where i=1, ..., M, N represents the number of data items of interest ($I_j$, where j=1, ..., N) in the plurality of databases, $R_i^j$ represents the ranking order of data item $I_j$ in database $D_i$, and the final ranking order of the ordered master listing is constructed by ranking $\overline{R}^j$, j=1, 2, ... N, in an ascending order.

9. the system according to claim 7, wherein said ordered master listing is ordered according to the following equation:

$$\overline{R}^j = \frac{1}{M}\sum_{i=1}^{M} \frac{S - S_i}{S} R_i^j$$

wherein M represents the number of the plurality of databases, $D_i$ represents each of the plurality of databases where i=1, ..., M, N represents the number of data items of interest ($I_j$, where j=1, ..., N) in the plurality of databases, $R_i^j$ represents the ranking order of data item $I_j$ in database $D_i$, $S_i$ is the number of records in $D_i$, $S = S_1 + S_2 + \ldots + S_M$ represents the total number of transactions, and the final ranking order of the ordered master listing is constructed by ranking $\overline{R}^j$, j=1, 2, ... N, in an ascending order.

10. A data structure for identifying relational patterns that exist across a plurality of databases, each of the plurality of databases including one or more records having one or more data items of interest, the data structure residing in a machine readable storage medium and comprising:

a root node;

a plurality of data nodes linked to said root node in a downwardly expanding tree structure having a plurality of data node branches;

wherein each of the plurality of data nodes has a form $\{x|y_1: \ldots :y_M\}$, where M is the number of the plurality of databases, x is a data item indicator for the one of the one or more data items of interest that is represented by the data node, $y_1, \ldots, y_M$ are data item support counters indicating the number of times that data item x appears in databases $D_1, \ldots, D_M$, respectively, in relation to other data items represented in the data branch having the data node such that the plurality of data nodes can be mined to identify one or more relational patterns that exists across the plurality of databases by considering pattern support data across the plurality of databases at the same time, the pattern support data based on the data item support data for the plurality of databases in the data item support counters of the hybrid frequent pattern tree, wherein the one or more relational patterns includes a pattern P including pattern data items and corresponding pattern data item support values derived from the one or more branches where the support for the pattern across the plurality of databases is determined according to:

$$P_{Sup} = \left\{ \min_{k=1,\ldots,K}\{Sup_{P[k]}^1\} : \ldots : \min_{k=1,\ldots,K}\{Sup_{P[k]}^M\} \right\}$$

where $\text{Sup}_{P[k]}^{i}$ is the support value of the $k^{th}$ data item in P (with respect to database $D_i$) and K is the number of items in P, M represents the number of the plurality of databases, $D_i$ represents each of the plurality of databases where i=1, ..., M.

11. A data structure according to claim 10, further comprising a header table including an ordered master listing ranking the data items of interest from across the plurality of databases, the data nodes of each data node branch arranged according to the ordered master listing.

12. A data structure according to claim 11, wherein the ordered master listing is ranked according to:

$$\overline{R}^j = \frac{1}{M}\sum_{i=1}^{M} R_i^j$$

wherein M represents the number of the plurality of databases, $D_i$ represents each of the plurality of databases where i=1, ..., M, N represents the number of data items of interest ($I_j$, where j=1, ..., N) in the plurality of databases, $R_i^j$ represents the ranking order of data item $I_j$ in database $D_i$, and the final ranking order of the ordered master listing is constructed by ranking $\overline{R}^j$, j=1, 2, ..., N, in an ascending order.

13. A data structure according to claim 11, wherein the ordered master listing is ranked according to:

$$\overline{R}^j = \frac{1}{M}\sum_{i=1}^{M} \frac{S - S_i}{S} R_i^j$$

wherein M represents the number of the plurality of databases, $D_i$ represents each of the plurality of databases where i=1, ..., M, N represents the number of data items of interest ($I_j$, where j=1, ..., N) in the plurality of databases, $R_i^j$ represents the ranking order of data item $I_j$ in database $D_i$, $S_i$ is the number of records in $D_i$, $S = S_1 + S_2 + \ldots + S_M$ represents the total number of transactions, and the final ranking order of the ordered master listing is constructed by ranking.

14. A machine readable storage medium comprising machine executable instructions for identifying relational patterns that exist across a plurality of databases, each of the plurality of databases including one or more records having one or more data items of interest, the instructions comprising:
   a set of instructions for generating a hybrid frequent pattern tree from the one or more records of the plurality of databases, the hybrid frequent pattern tree including one or more data node branches having one or more data nodes, each of the one or more data nodes representing one of the one or more data items of interest, the one or more data nodes of each of the one or more data node branches representing data items that are related to each other in records of the plurality of databases, each of the one or more data nodes having the following form: $\{x|y_1: \ldots :y_M\}$, where M is the number of the plurality of databases, x is a data item indicator for the one of the one or more data items of interest that is represented by the data node, $y_1, \ldots, y_M$ are data item support counters indicating the number of times that data item x appears in databases $D_1, \ldots, D_M$, respectively, in relation to other data items represented in the data branch having the data node; and
   a set of instructions for mining the hybrid frequent pattern tree to identify one or more relational patterns that exists across the plurality of databases by considering pattern support data across the plurality of databases at the same time, the pattern support data based on the data item support data for the plurality of databases in the data item support counters of the hybrid frequent pattern tree, wherein said mining includes determining a pattern P including pattern data items and corresponding pattern data item support values derived from the one or more branches where the support for the pattern across the plurality of databases is determined according to:

$$P_{Sup} = \left\{ \min_{k=1,\ldots,K} \{Sup_{P[k]}^1\} : \ldots : \min_{k=1,\ldots,K} \{Sup_{P[k]}^M\} \right\}$$

where $Sup_{P[k]}^i$ is the support value of the $k^{th}$ data item in P (with respect to database $D_i$) and K is the number of items in P, M represents the number of the plurality of databases, $D_i$ represents each of the plurality of databases where i=1, ..., M.

15. the machine readable storage medium according to claim 14, further comprising a set of instructions for generating an ordered master listing of the one or more data items of interest existing in the plurality of databases, each of the one or more data nodes of one of the one or more data branches organized in the same order as the ordered master listing.

16. the machine readable storage medium according to claim 15, wherein said set of instructions for generating an ordered master listing includes a set of instructions for ranking the one or more data items of interest across the plurality of databases according to the following equation:

$$\overline{R}^j = \frac{1}{M} \sum_{i=1}^{M} R_i^j$$

wherein M represents the number of the plurality of databases, $D_i$ represents each of the plurality of databases where i=1, ..., M, N represents the number of data items of interest ($I_j$, where j=1, ..., N) in the plurality of databases, $R_i^j$ represents the ranking order of data item $I_j$ in database $D_i$, and the final ranking order of the ordered master listing is constructed by ranking $\overline{R}^j$, j=1, 2, ... N, in an ascending order.

17. the machine readable storage medium according to claim 15, wherein said set of instructions for generating an ordered master listing includes a set of instructions for ranking the one or more data items of interest across the plurality of databases according to the following equation:

$$\overline{R}^j = \frac{1}{M} \sum_{i=1}^{M} \frac{S - S_i}{S} R_i^j$$

wherein M represents the number of the plurality of databases, $D_i$ represents each of the plurality of databases where i=1, ..., M, N represents the number of data items of interest ($I_j$, where j=1, ..., N) in the plurality of databases, $R_i^j$ represents the ranking order of data item $I_j$ in database $D_i$, $S_i$ is the number of records in $D_i$, $S=S_1+S_2+\ldots+S_M$ represents the total number of transactions, and the final ranking order of the ordered master listing is constructed by ranking $\overline{R}^j$, j=1, 2, ... N, in an ascending order.

18. the machine readable storage medium according to claim 14, wherein said set of instructions for generating a hybrid frequent pattern tree includes:
   a set of instructions for generating an ordered master listing of the one or more data items of interest existing in the plurality of databases; and
   a set of instructions that for each record in the plurality of databases,
      identifying a set of data items from the record that correspond to data items in the ordered master listing;
      ordering the set of data items in the same order as the data items in the ordered master listing;
      generating a data node branch representative of the set of data items, the data node branch including a data node for each data item of the set of data items, each data node in the data node branch including a data item indicator corresponding to one of the data items and a counter for each of the plurality of databases for tracking occurrences of data items in the plurality of databases at the same time, wherein said generating a data node branch includes:
         determining if a first level data node exists directly linked to a root node having a data item indicator corresponding to the first data item in the ordered set of data items;
         if not, creating a first data node having a data item indicator corresponding to the first data item and a counter for each of the plurality of databases, incrementing the counter of the first data node that corresponds to the database of the record, and setting the first data node as the current node;
         if so, incrementing the counter that corresponds to the database of the record for the first level data node and setting the first level data node as the current node; and
         determining for each subsequent data item in the order of the set of data items if there is a subsequent data node directly linked to the current node having a data item indicator corresponding to the subsequent data item in the order of the set of data items;
         if not, creating a subsequent data node linked to the current data node in the data node branch, the subsequent data node having a data item indicator corresponding to the subsequent data item and a counter for each of the plurality of databases, incrementing the counter of the subsequent data node that corresponds to the database of the record, and setting the subsequent data node as the current node;

if so, incrementing the counter that corresponds to the database of the record for the subsequent data node and setting the subsequent data node as the current node.

* * * * *

UNITED STATES PATENT AND TRADEMARK OFFICE
CERTIFICATE OF CORRECTION

PATENT NO. : 8,112,440 B2  Page 1 of 1
APPLICATION NO. : 12/593974
DATED : February 7, 2012
INVENTOR(S) : Wu et al.

It is certified that error appears in the above-identified patent and that said Letters Patent is hereby corrected as shown below:

In the Claims

Column 30, claim 1, line 57. Specifically, after the word "where" the equation $\text{Sup}_{P[k]}{}^{i}$ should read $\text{Sup}^{i}_{P[k]}$.

Column 33, claim 6, line 1. Specifically, after the word "where" the equation $\text{Sup}_{P[k]}{}^{i}$ should read $\text{Sup}^{i}_{P[k]}$.

Column 34, claim 10, line 18. Specifically, after the word "where" the equation $\text{Sup}_{P[k]}{}^{i}$ should read $\text{Sup}^{i}_{P[k]}$.

Column 35, claim 14, line 40. Specifically, after the word "where" the equation $\text{Sup}_{P[k]}{}^{i}$ should read $\text{Sup}^{i}_{P[k]}$.

Signed and Sealed this
Twenty-fifth Day of March, 2014

Michelle K. Lee
*Deputy Director of the United States Patent and Trademark Office*